United States Patent
Hancock et al.

(10) Patent No.: US 9,697,523 B2
(45) Date of Patent: Jul. 4, 2017

(54) RECALLED PRODUCT INVENTORY NOTIFICATION, REMOVAL, AND VERIFICATION SYSTEM

(75) Inventors: Roger Hancock, Boise, ID (US); John Bushland, Boise, ID (US); Brian Denker, Boise, ID (US); Jacque Istok, Boise, ID (US)

(73) Assignee: RECALL INFOLINK, INC., Boise, ID (US)

( * ) Notice: Subject to any disclaimer, the term of this patent is extended or adjusted under 35 U.S.C. 154(b) by 257 days.

(21) Appl. No.: 13/370,242

(22) Filed: Feb. 9, 2012

(65) Prior Publication Data

US 2012/0209780 A1 Aug. 16, 2012

Related U.S. Application Data

(63) Continuation of application No. 12/355,716, filed on Jan. 16, 2009, now Pat. No. 8,145,574.

(Continued)

(51) Int. Cl.
*G06Q 10/00* (2012.01)
*G06Q 30/00* (2012.01)
(Continued)

(52) U.S. Cl.
CPC ......... *G06Q 30/014* (2013.01); *G06Q 10/087* (2013.01); *G06Q 10/30* (2013.01); *G06Q 50/26* (2013.01); *Y02W 90/20* (2015.05)

(58) Field of Classification Search
None
See application file for complete search history.

(56) References Cited

U.S. PATENT DOCUMENTS 6,611,806 B1  8/2003  Harvey
7,069,231 B1  6/2006  Cinarkaya et al.
(Continued)

FOREIGN PATENT DOCUMENTS

JP  2002-207938 A  7/2002
JP  2006-65671 A  3/2006

OTHER PUBLICATIONS

United States Department of Agriculture Food Safety and Inspection Service: "FSIS Directive" http://web.archive.org/web/20040725035812/http://www.fsis.usda.gov/OPPDE/rdad/FSISDirectives/8080.1Rev4.pdf, Available May 24, 2004.*
(Continued)

*Primary Examiner* — Paul R Fisher
(74) *Attorney, Agent, or Firm* — Lewis Roca Rothgerber Christie LLP

(57) ABSTRACT

A recall management system allows generating, tracking, and verifying product recalls. The system provides notifications of a product recall to affected and unaffected businesses in the supply chain, as well as notification of the public and government agencies that may be affected. Verification of received notifications and the quantity of product removed from supply in response to the recall allows for closure of recall activity. Recalls may be extended over time as additional products needing to be recalled from the particular supplier of the recalled product are identified. Product returns over time are added to the total product recovered and scorecards updated in real-time as the return information is tabulated. Affected businesses and government agencies have visibility to both recall message receipt and product recovered as a part of total product recalled.

21 Claims, 31 Drawing Sheets

Related U.S. Application Data

(60) Provisional application No. 61/011,399, filed on Jan. 16, 2008.

(51) Int. Cl.
*G06Q 10/08* (2012.01)
*G06Q 50/26* (2012.01)

(56) References Cited

U.S. PATENT DOCUMENTS

| | | |
|---|---|---|
| 7,194,429 B2 | 3/2007 | Takae et al. |
| 2001/0029483 A1 | 10/2001 | Schultz et al. |
| 2001/0042022 A1 | 11/2001 | Kirkpatrick et al. |
| 2001/0051882 A1* | 12/2001 | Murphy et al. ............. 705/3 |
| 2001/0053980 A1 | 12/2001 | Suliman, Jr. et al. |
| 2001/0056359 A1 | 12/2001 | Abreu |
| 2003/0036916 A1* | 2/2003 | Kitajima ................... 705/1 |
| 2003/0040929 A1 | 2/2003 | Knegendorf et al. |
| 2003/0061104 A1 | 3/2003 | Thomson et al. |
| 2003/0074272 A1 | 4/2003 | Knegendorf et al. |
| 2003/0171974 A1 | 9/2003 | Taschner |
| 2003/0172077 A1 | 9/2003 | Moussavian |
| 2003/0177025 A1 | 9/2003 | Curkendall et al. |
| 2004/0059613 A1 | 3/2004 | Ford et al. |
| 2004/0064333 A1 | 4/2004 | J'Maev |
| 2004/0068418 A1 | 4/2004 | J'maev |
| 2004/0068484 A1 | 4/2004 | J'maev |
| 2004/0083201 A1 | 4/2004 | Sholl et al. |
| 2004/0132000 A1* | 7/2004 | Dowdell et al. ............ 434/350 |
| 2004/0236600 A1 | 11/2004 | J'maev |
| 2004/0267608 A1 | 12/2004 | Mansfield, Jr. |
| 2005/0004811 A1 | 1/2005 | Babu |
| 2005/0038691 A1 | 2/2005 | Babu |
| 2005/0222863 A1 | 10/2005 | Jmaev |
| 2005/0222864 A1 | 10/2005 | J'maev |
| 2005/0273369 A1 | 12/2005 | Ota et al. |
| 2006/0004585 A1 | 1/2006 | Shukosky et al. |
| 2006/0011720 A1 | 1/2006 | Call |
| 2006/0190327 A1 | 8/2006 | Jmaev |
| 2006/0265236 A1 | 11/2006 | J'maev et al. |
| 2006/0277058 A1 | 12/2006 | J'maev et al. |
| 2006/0277059 A1 | 12/2006 | J'Maev et al. |
| 2007/0005608 A1 | 1/2007 | Adler |
| 2007/0069004 A1 | 3/2007 | Adler |
| 2007/0213997 A1 | 9/2007 | J'maev et al. |
| 2007/0239502 A1 | 10/2007 | Babu |
| 2007/0255801 A1 | 11/2007 | Adler |

OTHER PUBLICATIONS

Axtell, J. et al., "Improving Recalls at the Food Safety Inspection Service", Report of the Recall Policy Working Group, Food Safety and Inspection Service, U.S. Department of Agriculture, Aug. 1998.
Business Wire, Instill Introduces Recall Management Solution for Foodservice Industry; Will Reduce Risk, Increase Visibility and Improve Supply Chain Collaboration Around Food Product Recalls, http://www.highbeam.com/doc/1G1-143480290.html, Mar. 21, 2006.
PRWEB, Instill Corporation Named Top Technology Company in Food Logistics Annual FL100 Awards, http://www.prweb.com/releases/2007/12/prweb575609.htm, Dec. 11, 2007.

* cited by examiner

Figure 2

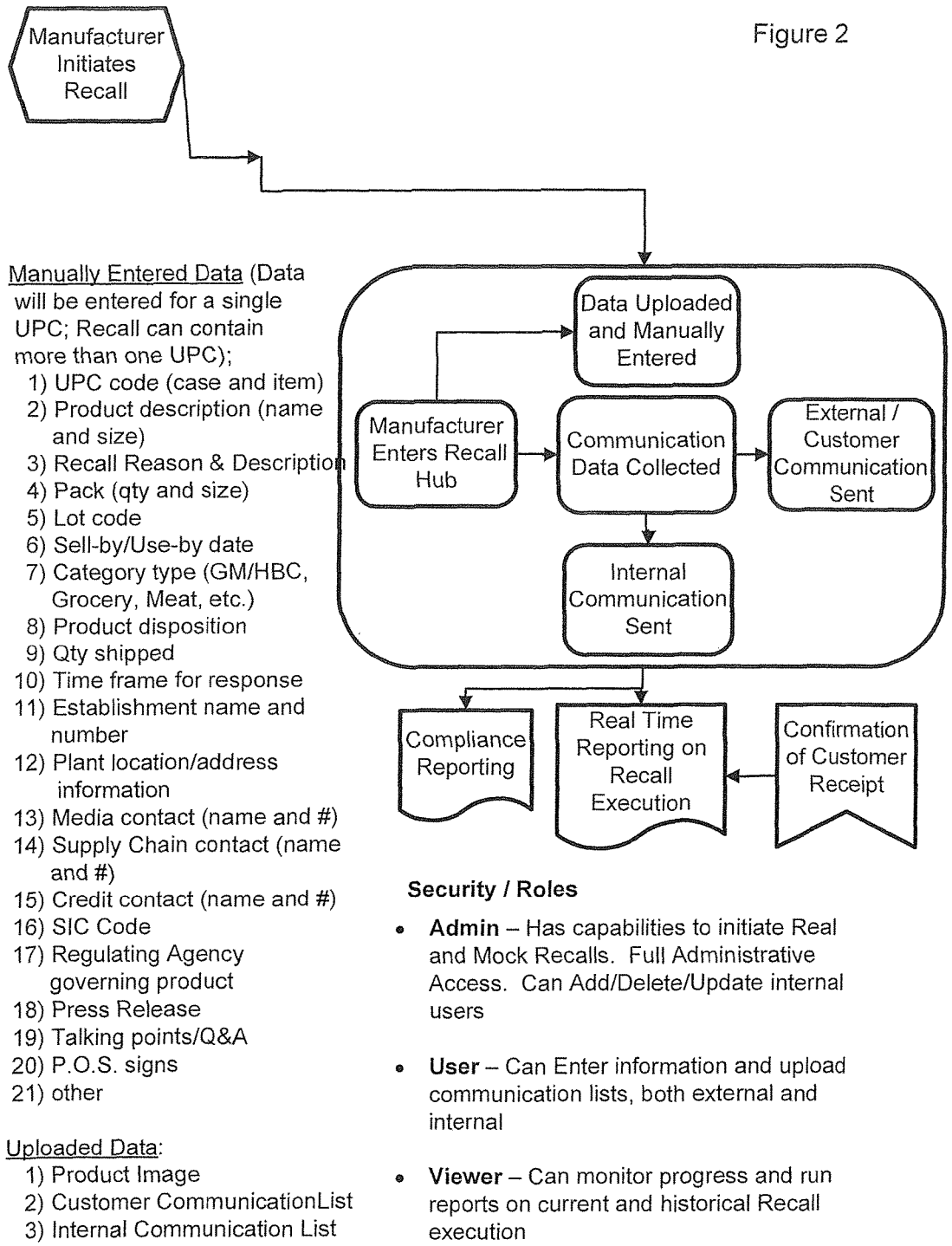

Manually Entered Data (Data will be entered for a single UPC; Recall can contain more than one UPC);
1) UPC code (case and item)
2) Product description (name and size)
3) Recall Reason & Description
4) Pack (qty and size)
5) Lot code
6) Sell-by/Use-by date
7) Category type (GM/HBC, Grocery, Meat, etc.)
8) Product disposition
9) Qty shipped
10) Time frame for response
11) Establishment name and number
12) Plant location/address information
13) Media contact (name and #)
14) Supply Chain contact (name and #)
15) Credit contact (name and #)
16) SIC Code
17) Regulating Agency governing product
18) Press Release
19) Talking points/Q&A
20) P.O.S. signs
21) other Uploaded Data:
1) Product Image
2) Customer CommunicationList
3) Internal Communication List

Security / Roles
- Admin – Has capabilities to initiate Real and Mock Recalls. Full Administrative Access. Can Add/Delete/Update internal users

- User – Can Enter information and upload communication lists, both external and internal

- Viewer – Can monitor progress and run reports on current and historical Recall execution

Security / Roles (POS)

- User –

- Viewer – Can look up and review details about Recall and run reports

FIG. 7

Recall Information

Enter a Recall Event Name, Recall Effective Date and Time Frame for Response. GTIN is optional.

Recall Event Name:
Recall naming protocol for event names:
"Manufacturer" action taken "product."    ie "Tasty Food's recalls prepared foods."

* — 206

Recall Effective Date:    * 208
Time Frame for Response:    * — 210

GTIN (optional):

* = required data

1. Create Recall Event    2. Edit Contact Info    3. List Recalled Items    4. Create Distribution List    5. Review and Submit Create Recall Event

Recall Distribution Messages
Enter the messages that will be sent to your distribution list below

Affected Customers — 222

Hello. This is Recall InfoLink with an important message from Tastyfoods, test18 . The Recall InfoLink web site at http://recall.pliglabel.com contains all the details you need to know.

Nonaffected Customers — 224

Hello. This is Recall InfoLink. Tastyfoods has announced a recall. Tastyfoods records indicate that you were not sent any recalled product. However, you may want to check your inventory to be sure that you did not receive recalled product from another source. The Recall InfoLink web

Internal Customers — 226

Hello. This is Recall InfoLink with notification of a recall issued by Tastyfoods. At this time, selected customers are also being contacted to alert them about this recall. If you have any questions please contact your recall coordinator << Back    Continue >>

1. Create Recall Event    2. Edit Contact Info    3. List Recalled Items    4. Create Distribution List    5. Review and Submit Create Recall Event

*FIG. 8D*

1. Create Recall Event  2. Edit Contact Info  3. List Recalled Items  4. Create Distribution List  5. Review and Submit Edit Contact Information

Manufacturer Information
Enter the Manufacturer contact information.

Manufacturer Name:
Manufacturer Address:
Manufacturer City:
Manufacturer Country: United States  State: Alabama  Zipcode:
Manufacturer Phone:
USDA Establishment #:

<< Back    Continue >>

*FIG. 8E*

*List Recalled Items*

1. Create Recall Event  2. Edit Contact Info  3. List Recalled Items  4. Create Distribution List  5. Review and Submit

| UPC/Item Number | GTIN | Product Description | Pack | Size | Lot Code | Image | Sell/UseBy Date | Category | Qty Shipped | Delete |
|---|---|---|---|---|---|---|---|---|---|---|

Add Item — 230
Upload CSV — 234
Apply Item Changes

Add Item — 232

236 —
UPC: *
Lot Code: *
Quantity Shipped: *
Sell/Use By Date: *
Image:

Add Item    Cancel

<< Return to Step 2    Continue to Step 4 >>

*FIG. 8F*

1. Create Recall Event   2. Edit Contact Info   3. List Recalled Items   4. Create Distribution List   5. Review and Submit

Create Distribution List

Distribution List

[Add Customer] [Upload Customer CSV] —238   [Apply Changes]

| First Name | Last Name | Email | Company | Phone | Fax | SMS | Class | Remove |
|---|---|---|---|---|---|---|---|---|

[<< Return to Step 3]   [Continue to Step 5 >>]

1. Create Recall Event   2. Edit Contact Info   3. List Recalled Items   4. Create Distribution List   5. Review and Submit

*Review and Submit*

Review and Submit

You are now able to review the Recall information and confirm that each

Click the 'Initiate Recall' button when you are done.

| Recall Event | Reviewed ✓ |
| Contact Information | Reviewed ✓ |
| Recall Items | Reviewed ✓ |
| Distribution List | Reviewed |
| Recall Message | Reviewed |

Save Recall for Later            Initiate Recall — 242

*FIG. 8I*

From: noreply@recallinfolink.com
Subject: Recall Notification
Date: January 9, 2009 10:41:33 AM MST
To: ABC@recallinfolink.com Hello, This is Recall InfoLink with an important message from Testyfoods.

Log in email => ABC@recallinfolink.com — 252
Log in password => XXX — 254

Please click the following link to verify receipt of this message:
http://recall.rsiglobal.com/access_hash=095a87a8cd81a912b3b9e9871ab7fe7 — 256

The Recall InfoLink web site at http://recall.rsiglobal.com contains all the details you need to know. — 250

FIG. 9A

Recent Recalls new

Issued by David Reuteler on Thu Oct 2008 04:08:14

Lakeland, FL -- March 14, 2008 -- ¶    Super Markets is issuing a voluntary recall on all codes of prepackaged 2 and 4-pack Apple, Pineapple and Pumpkin Empanadas sold in retail bakeries due to the undeclared milk ingredient. People who have an allergy or severe sensitivity to milk run the risk of serious or life-threatening allergic reaction if they consume these products. "The packaging error was detected during a routine label review," said ( media and community rel...

Read the rest - created Thu Oct 2008 04:08:14 PM - updated Thu Nov 2008 05:29:10 PM

*FIG. 9B*

1. Recall Information  2. Manufacturer Contacts  3. Distributor Contacts  4. Item Reporting  5. Distribution List  6. Email Message

*Recall Information*

Review Recall Information

Event Name: test email

Item:
UPC: 123
Lot Code: 123
Sell/Use By Date: 01/23/2009

SCC Code:
Effective Date: 01/15/2009
Agency Type: None

Response Time: 3 hr(s)
Disposition Directions:
None

Recall Reason and Desc:

Recall Press Release:

Talking Points / Q & A:

Save/Exit => Finish this recall later.   Continue to Step 2 >>

*FIG. 9C*

1. Recall Information  2. Manufacturer Contacts  3. Distributor Contacts  4. Item Reporting  5. Distribution List  6. Email Message

Item Reporting

Recall Items

[ Apply Item Changes ]

| UPC/Item Number | GTIN | Product Description | Pack | Size | Lot Code | Image | Sell/UseBy Date | Category | Qty Shipped | Qty Removed |
|---|---|---|---|---|---|---|---|---|---|---|
| 123 | 0 | | 1 | 18 OZ JAR | 123 | | 01/23/2009 | Grocery | 260 | |

[ << Return to Step 3 ]   Save/Exit => Finish this recall later.   [ Continue to Step 5 >> ]

*FIG. 9D*

1. Recall Information    2. Manufacturer Contacts    3. Distributor Contacts    4. Item Reporting    5. Distribution List    6. Email Message

Create Email Message

Recall Distribution Messages

Enter the messages that will be sent to your distribution list below

Affected Customers

Hello. This is Recall InfoLink with an important message from            , test email . The Recall InfoLink web site at http://recall.riiglobal.com contains all the details you need to know.

Nonaffected Customers

Hello. This is Recall InfoLink.            has announced a recall,            records indicate that you were not sent any recalled product. However, you may want to check your inventory to be sure that you did not receive recalled product from another source. The Recall InfoLink web

Internal Customers

Hello. This is Recall InfoLink with notification of a recall issued by            . At this time, selected customers are also being contacted to alert them about this recall. If you have any questions please contact your recall coordinator (

270

<< Return to Step 5        Save/Exit => Finish this recall later.        Continue and Verify Recall

*FIG. 9E*

| Recall Name | Recall Date | Details | Continue Wizard | Score Card | Status | Reports |
|---|---|---|---|---|---|---|
| | 12/04/2008 | View Recall | Enter Wizard | View Score Card | In Progress | View Report |
| | 11/21/2008 | View Recall | Enter Wizard | View Score Card | In Progress | View Report |
| | 11/21/2008 | View Recall | Enter Wizard | View Score Card | In Progress | View Report |
| | 09/28/2008 | View Recall | Enter Wizard | View Score Card | In Progress | View Report |
| | 09/27/2008 | View Recall | Enter Wizard | View Score Card | In Progress | View Report |

1. Recall Information    2. Manufacturer Contact Information    3. Distributor Contact Information    4. Recall Items

Recall Items

Recall Items — 400

| UPC/Item Number | GTIN | Product Description | Pack | Size | Lot Code | Image | Sell/UseBy Date | Category | Qty Removed |
|---|---|---|---|---|---|---|---|---|---|
| | | | | | | | | Apply Item Changes | |
| 123 | 0 | | 1 | 18 OZ JAR | 99 | | 01/30/2009 | Grocery | |

<< Return to Step 3    Save/Exit => Finish this recall later.    Complete Recall >> — 402

*FIG. 10B*

| Recall Name | Recall Date | Details | Continue Wizard | Status | Reports |
|---|---|---|---|---|---|
| FDA Office of Enforcement demon | 12/04/2008 | View Recall | Enter Wizard — 500 | In Progress | View Report |

Home  Logout

*FIG. 10C*

Conduct a mock recall

Steps for Conducting a Mock Recall

Before conducting a mock recall, make sure you have completed the following steps:

- ☐ Assemble the mock recall team and clearly assign duties to each member of the recall team
- ☐ Develop a recall scenario
- ☐ Collect the facts that suggest a recall is necessary
- ☐ Use the facts to understand recall scope
- ☐ Determine any regulatory compliance issues that must be addressed with the recall
- ☐ Collect all relevant information for each recalled item
- ☐ Determine which of your customers are affected by this recall, and build csv files
- ☐ Determine the quantity of items shipped, with PO's, to each affected customer
- ☐ Prepare a list of internal contacts who need to be notified of this recall
- ☐ Develop corrective actions
- ☐ Develop preventive measures

[ Select All ] [ Clear All ]

[ Conduct Mock Recall ]

— 600

Schedule a mock recall

Last mock recall: Sat Jun 7 2008
Upcoming mock recall: Mon Jan 12 2009
Recommended Recall Frequency: Bi Yearly
Pick a Mock Recall date:

Mock Recall Email Reminder

[ Click to schedule a Mock Recall ]

Learn about recalls

Explore recall best practices guidelines
Search knowledge base and white papers
How to conduct an effective mock recall

*FIG. 11*

RECALLED PRODUCT INVENTORY NOTIFICATION, REMOVAL, AND VERIFICATION SYSTEM

CROSS-REFERENCE TO RELATED APPLICATIONS

This application is a continuation of U.S. patent application Ser. No. 12/355,716, filed Jan. 16, 2009, now U.S. Pat. No. 8,145,574 which claims the benefit of U.S. Provisional Application No. 61/011,399, filed on Jan. 16, 2008, the content of both of which are incorporated herein by reference.

FIELD OF THE INVENTION

The present invention relates generally to product recall systems, and more particularly, to a product recall system that assists businesses, government agencies, and the public in executing a product recall through to completion using standardized content and flow of recall information, verifying receipt of recall notification, and tabulating the amount of recalled product recovered versus the amount of recalled product shipped into the supply stream.

BACKGROUND OF THE INVENTION

The number and frequency of product recalls is growing. This growth is resulting from a number of factors including regulatory changes, increasing product imports from countries with varying manufacturing standards, improved ability to identify the source of food borne illness outbreaks, heightened media coverage, and greater public sensitivity.

Industry's ability to remove recalled product from supply has not kept pace with the ability to enter and distribute product into the supply stream. The lack of value from removing product has prevented investment into this essential business function, resulting in a lack of ability to execute recalls expeditiously. Public health, brand equity, and legal liability are all potential casualties of deficient recall abilities. The threat of intentional contamination that could cause mass illness and death now compounds the normal business need for product removal.

Manufacturers of consumer products at times find that products in distribution for sale need to be removed from sale and recovered to protect their brand, safeguard the public's health, or to comply with government regulations. The business methods employed to remove and recover product vary widely within and across industries.

A standardized method for notification, removal, and verification of product from distribution is desirable to provide numerous efficiencies and advantages to all segments of industry, as well as to the public and regulatory agencies. Existing, and even emerging methods to accomplish a recall of product from distribution currently lack a comprehensive capability. Existing recall mechanisms generally focus on point-to-point notification to specific segments of business or the public impacted by a product recall. These existing mechanisms are generally insufficient solutions for businesses seeking to protect their brand and their customers from the often devastating consequences of product recall.

As an example, the prior art describes recall mechanisms that identify customers of recalled products, broadcast advisory alerts to subscribers, allow manufacturers to enter advisories related to product defects, and identify defects in products that may lead to recalls. However, there is a need in the prior art of a method for communicating, tracking, and verifying the specific actions commonly related to product recalls across all affected stakeholders that goes beyond mere notifications of recalled products.

SUMMARY OF THE INVENTION

According to one embodiment, the present invention allows improved speed in the removal of product from all nodes within the network of product distribution through rapid distribution and consistency of recall messaging to all affected entities. Furthermore, messages to non-affected entities that they are indeed not affected by the recall allows such non-affected entities peace of mind when a product recall becomes public.

One embodiment of the present invention allows for suppliers of a recalled product to notify their customers who received and those who didn't receive recalled product, as well as to monitor receipt of notification and the amount of recalled product removed from the supply chain. In addition, business compliance with certain government regulations will be facilitated by the database and reporting capabilities of the invention.

One embodiment of the present invention allows for relevant government agencies to monitor the progress of recall notification and product recovery. In addition to monitoring recall progress, the government agencies may also receive automated reports that comply with agency regulations, including but not limited to FDA form 3177.

One embodiment of the present invention allows for targeted follow up with notified parties who within a specified time frame either do not verify receipt of recall notification, or do not verify product removal as a result of notification.

One embodiment of the present invention allows public users of the system to view point-of-sale establishments in their marketing area, including on-line shopping, of businesses that are affected by the recall.

One embodiment of the present invention helps protect brand equity and public health.

In this regard, a recall server is provided which is accessible via the Internet. The server is configured with programming which allows for communication with specified target audiences through multiple, specified communication devices. The programming also allows for data capture in a database management system that facilitates reporting of recall process flow on a number of different planes for business and government entities.

According to one embodiment, the recall server includes a recall database storing information on one or more recall events, a processor, and a memory coupled to the processor and storing computer instructions. The processor is configured to execute the program instructions which include: receiving from a recall initiator a recall event identifying at least one product to be recalled and product disposition instructions; storing the recall event in the recall database; generating one or more electronic recall notifications based on the received recall event; identifying a plurality of customers; transmitting the one or more electronic recall notifications to the identified customers; monitoring progress of the recall event, wherein the monitoring includes periodically receiving from one or more of the identified customers, information on quantities of the product disposed according to the product disposition instructions; updating by the recall server an aggregate disposition amount based on the received quantities; and generating a report based on the monitored progress.

According to one embodiment of the invention, the computer instructions executed by the recall server further include retrieving customer type information stored in association with each of the identified customers; and catering the recall notifications to the identified customer types.

According to one embodiment of the invention, the customer type information identifies a first one of the identified customers as being a purchaser of the product and a second one of the identified customers as not being a purchaser of the product. A first type of product recall notification is then transmitted to the first customer and a second type of the product recall notification is transmitted to the second customer. The first type of product recall notification may be an alert for prompting action according to the product disposition instructions. The second type of product recall notification may be a confirmation that the second one of the plurality of customers is not affected by the recall event.

According to one embodiment of the invention, the computer instructions executed by the recall server further include: determining whether a predetermined amount of time has elapsed without receiving acknowledgment of the recall notification by any one of the identified customers; generating an exception report in response to the determination that the predetermined amount of time has elapsed without the acknowledgement, the exception report including information on the customer who is non-responsive; and forwarding the exception report to the recall initiator.

According to one embodiment of the invention, the computer instructions executed by the recall server further include: modifying the recall event in response to a user input; storing the modified recall event in the recall database, wherein the modified recall event is stored as an updated version of the recall event; and monitoring progress of the modified recall event separately from the recall event. The user input modifying the recall event may be provided by one of the identified customers in response to receipt of the recall notification.

According to one embodiment of the invention, the computer instructions executed by the recall server for modifying the recall event includes program instructions for storing information on a second product to be recalled, or adding a new customer to the identified customers. If a new customer is added, the computer instructions further include transmitting over the data communications network a second electronic recall notification to the new customer for the modified recall event; periodically receiving information on second quantities of the product disposed according to the product disposition instructions; computing the aggregate disposition amount based on the quantities of the product and the second quantities of the product; and displaying the aggregate disposition amount.

According to one embodiment of the invention, the computer instructions executed by the recall server for monitoring the progress of the recall event includes comparing the aggregate disposition amount against a quantity of the product distributed to the customers; and displaying statistical information for the recall event based on the comparison.

According to one embodiment of the invention, the computer instructions executed by the recall server further include generating a progress report based on the monitored progress, the progress report being updated in real-time with the updating of the information on the quantities of the product disposed according to the product disposition instructions.

According to one embodiment of the invention, the computer instructions executed by the recall server further include identifying a template form for the recall event; automatically filling the template form based on information on the recall event provided by the recall initiator; and transmitting the filled template form to a recipient over a data communications network. The template form may be a form provided by a government agency.

According to one embodiment of the invention, the computer instructions executed by the recall server further include: identifying a type of the customers receiving the recall notification; selecting information on the recall event for display to the customers based on the identified type.

According to one embodiment of the invention, the computer instructions executed by the recall server further include updating status of the recall event based on the aggregate disposition amount.

A person of skill in the art should recognize that the recall management system according to embodiments of the present invention allows monitoring and management of the recall process from beginning to end. Unlike prior recall systems, the recall process provided by the system according to embodiments of the present invention does not end after the recall notifications are sent. Instead, monitoring and management of the recall process continue even after the recall notifications are transmitted by receiving and processing information about dispositions of the products that are being recalled. The system may therefore measure the speed and efficacy of a recall effort. The system further tracks whether products are actually being removed in a timely manner in response to the recall notification, and takes affirmative action (e.g. a follow-up inquiry) in response to a determination that products are not actually being removed in a timely manner.

A person of skill in the art should also recognize that the recall management system according to embodiments of the present invention allows a distributor or another entity downstream of a manufacturer to add or continue the recall upon receipt of a recall notification from the manufacturer by, for example, adding their own list of customers and sending recall notifications to customers on that list. Acknowledgments and information on products removed in response to the modified recall can be monitored, tracked, and reported separately from the original recall event. Association is maintained, however, with the original recall event for combined monitoring and reporting, such as, for example, for tabulating a total amount of recalled products that have been returned or otherwise disposed.

A person of skill in the art should further recognize that the embodiments of the present invention allow recalls to be managed with a consistent, inclusive message that is relayed through multiple consignee levels, that tracks inventory movements in response to the notification, and that provides regulatory oversight, to help speed up and transform product recalls to restore consumer confidence, and protect industry from intentional contamination threats.

BRIEF DESCRIPTION OF THE DRAWINGS

FIG. 2 is a flow diagram of the specific steps taken by a manufacturer and accomplished by a recall server to initiate notification of a recall, as well as reporting steps and follow up notification, according to one embodiment of the invention;

FIG. 7 is an exemplary FDA form that is automatically filled out by the recall server for transmitting to the relevant government agency in response to a product recall, according to one embodiment of the invention;

FIG. 8A-8I are screenshots of a graphical user interface provided by a recall server for generating a recall event according to one embodiment of the invention;

FIGS. 9A-9G are screenshots of a graphical user interface provided to a distributor for continuing a recall or providing product disposition information in response to a recall notification according to one embodiment of the invention;

FIGS. 10A-10C are screenshots of a graphical user interface provided to a POS establishment providing product disposition information in response to a recall notification according to one embodiment of the invention;

FIG. 11 is a screenshot of a graphical user interface for conducting mock recalls according to one embodiment of the invention;

DETAILED DESCRIPTION

Figure 1:
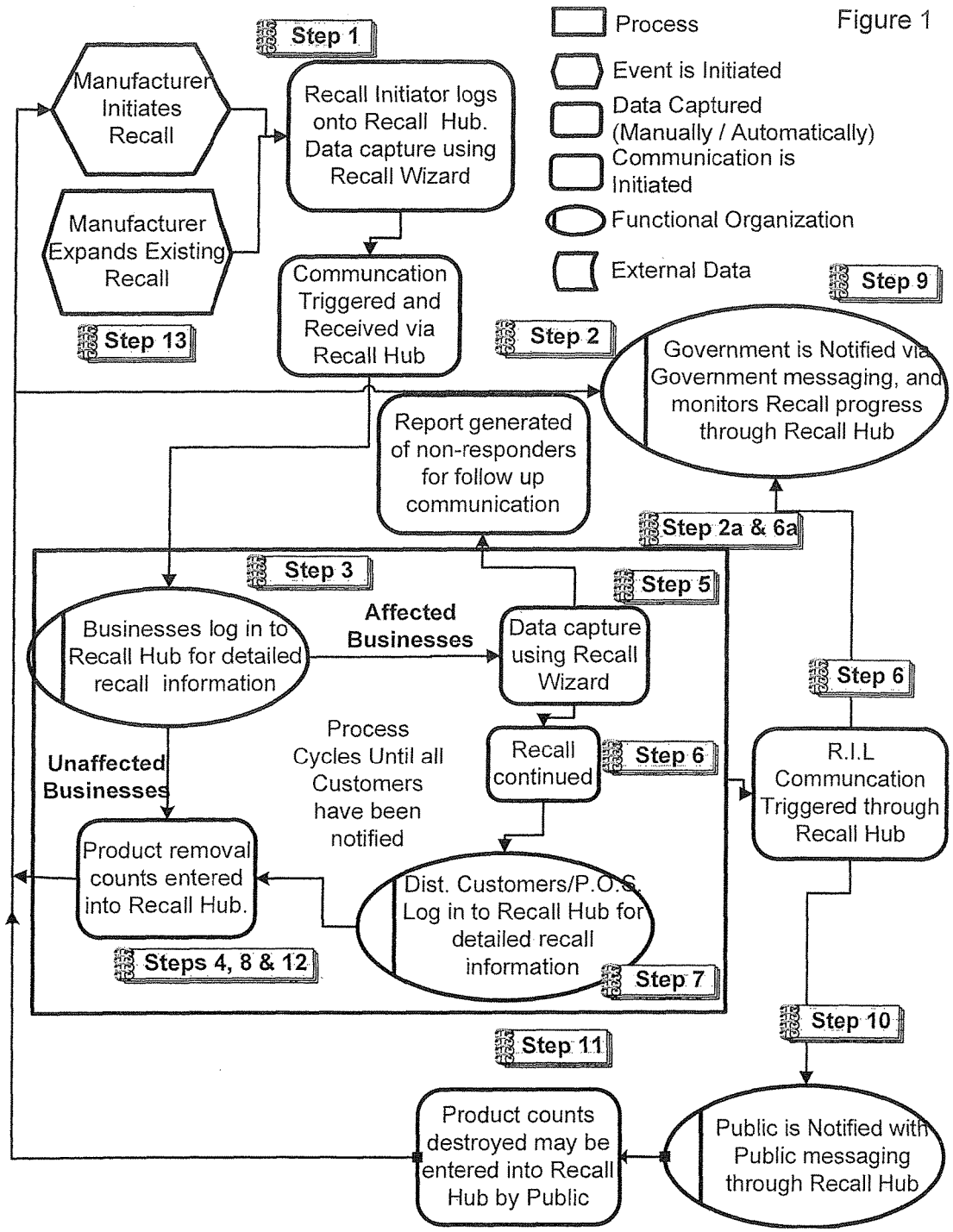
FIG. 1 is a flow diagram of an overall recall process illustrating the flow of information from the manufacturer across the network of supply, to government agencies, and to the public, according to one embodiment of the invention.
Figure 3:
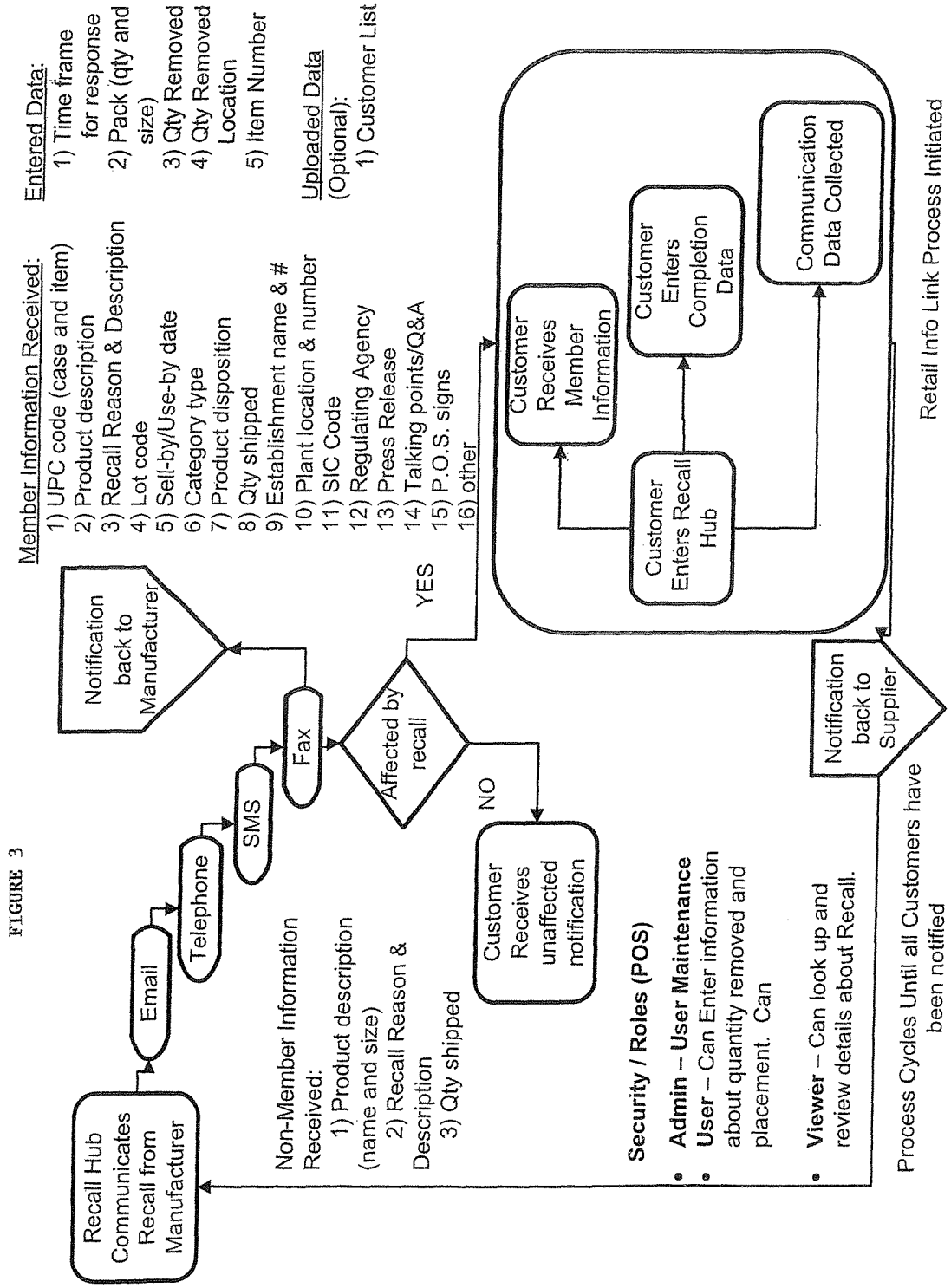
FIG. 3 is a flow diagram of the communication process from the initiated recall through communication to additional supply chain and POS customers, and data collection flow that allows manufacturer and earlier suppliers to monitor the progress of recall notification and product removal, according to one embodiment of the invention.
Figure 4:
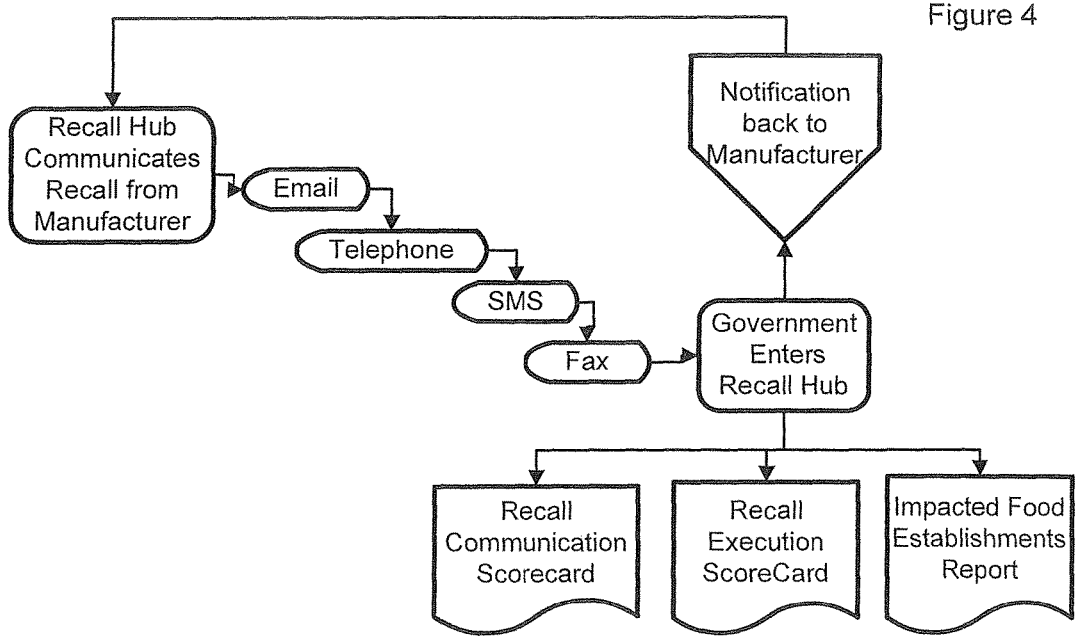
FIG. 4 is a flow diagram of a government agency notification of a recall, and government monitoring of recall progress, according to one embodiment of the invention.
Figure 5:
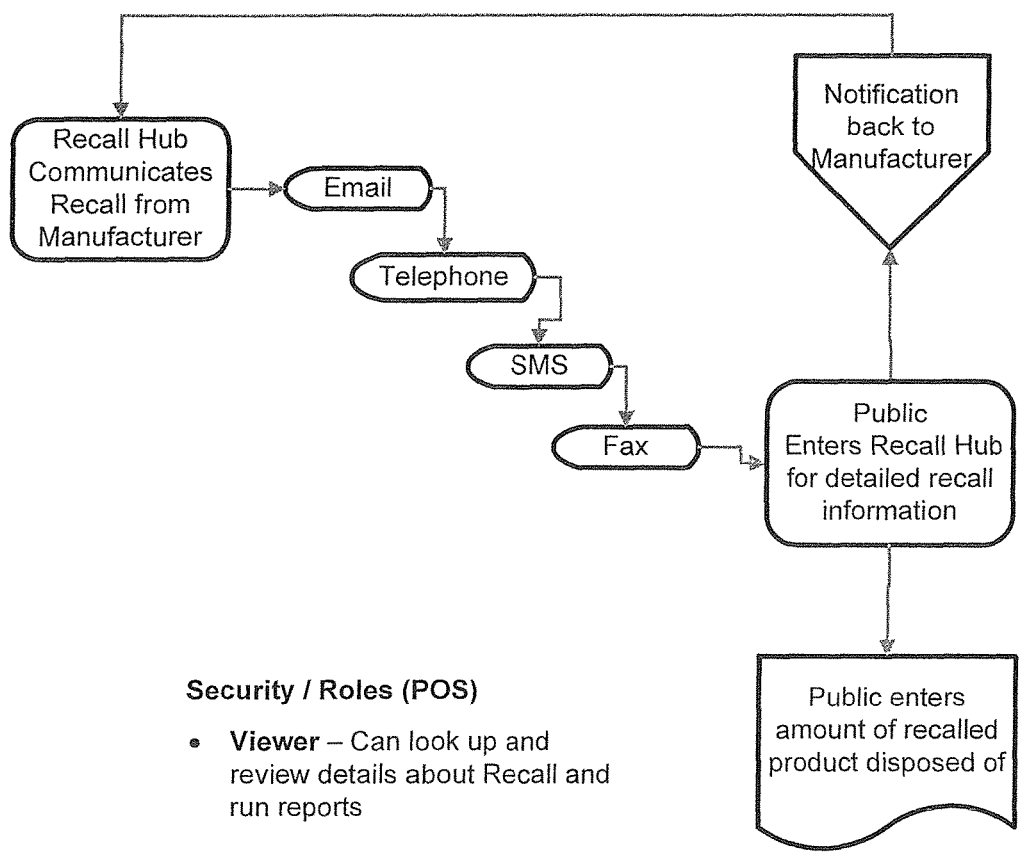
FIG. 5 is a flow diagram of customer notification of a recall for subscribers, and general recall information hosted on a web site viewable to the public, according to one embodiment of the invention.

In general terms, the present invention is directed to a system and method for monitoring and managing product recalls. The system includes a central recall server for access by manufacturers, distributors, point-of-sale (POS) establishments, government agencies, and the public, to provide or obtain product recall information. The recall server standardizes the obtaining of the product recall information as well as communication of such information to the public. The progress of the product recall may also be monitored by the recall server as information is compiled on products removed by the affected entities, and reports generated based on the monitored information.

According to one embodiment, the recall server manages the creation of a standardized recall bulletin with associated messaging, and processes both outbound and inbound communications to notify specified stakeholders of recalls, and monitors responses to recall notification and product removal. The recall data may be manually entered, copied and pasted, uploaded, entered using other electronic mechanism, or any combination thereof, into a specified template that allows the server to tailor the outgoing message to each stakeholder group (e.g. distributors, customers, government, public, and the like). The server accesses prioritized stakeholder communication devices (e.g. e-mail, telephone, SMS, fax, etc.) sequentially to initiate recall notifications. The recall server differentiates between affected and unaffected stakeholders to provide distinct messages that specify necessary actions in response to the recall notification. Companies can also pre-set system parameters to communicate recall events and/or mock recall events regardless of their customer status (affected, non-affected).

According to one embodiment, the notified parties may receive detailed recall information by logging onto the server or via other specified notification mechanism. The recall server differentiates between different customer types (e.g. distributor, POS establishment, internal, and the like) to bring customers into a website screen appropriate to their customer type. The customer type is entered by default for each customer listed on a customer list based on the entity that is entering the customer data. For example, if a manufacturer is entering the customer list, all entities listed in the customer list may be identified by default as a distributor. Of course, the user entering the information may then modify the customer type if different from the default type.

According to one embodiment, an initial recall event may be expanded to add additional items over time as needed in response to additional investigation or regulatory involvement. Companies can set up administration rights and privileges for multiple users within the company such that users can input, view, and or modify recall information based upon established privileges. The expanded recall is an integral part of an existing recall, but is managed, searched, and tracked separately.

According to one embodiment, the server allows multiple responses, over time, from the same entity to account for additional recovered product from additional customer returns, additional recalled product received from product in transit at the time of recall, or other causes, and adds it to the total amount of product recovered for comparing against the amount of product recalled. This information may then be displayed as real-time progress reports.

According to one embodiment, data captured can be translated by an algorithm into a Event status (Pending, Ready, Communicating, New, In Progress, Saved).

Figure 6:
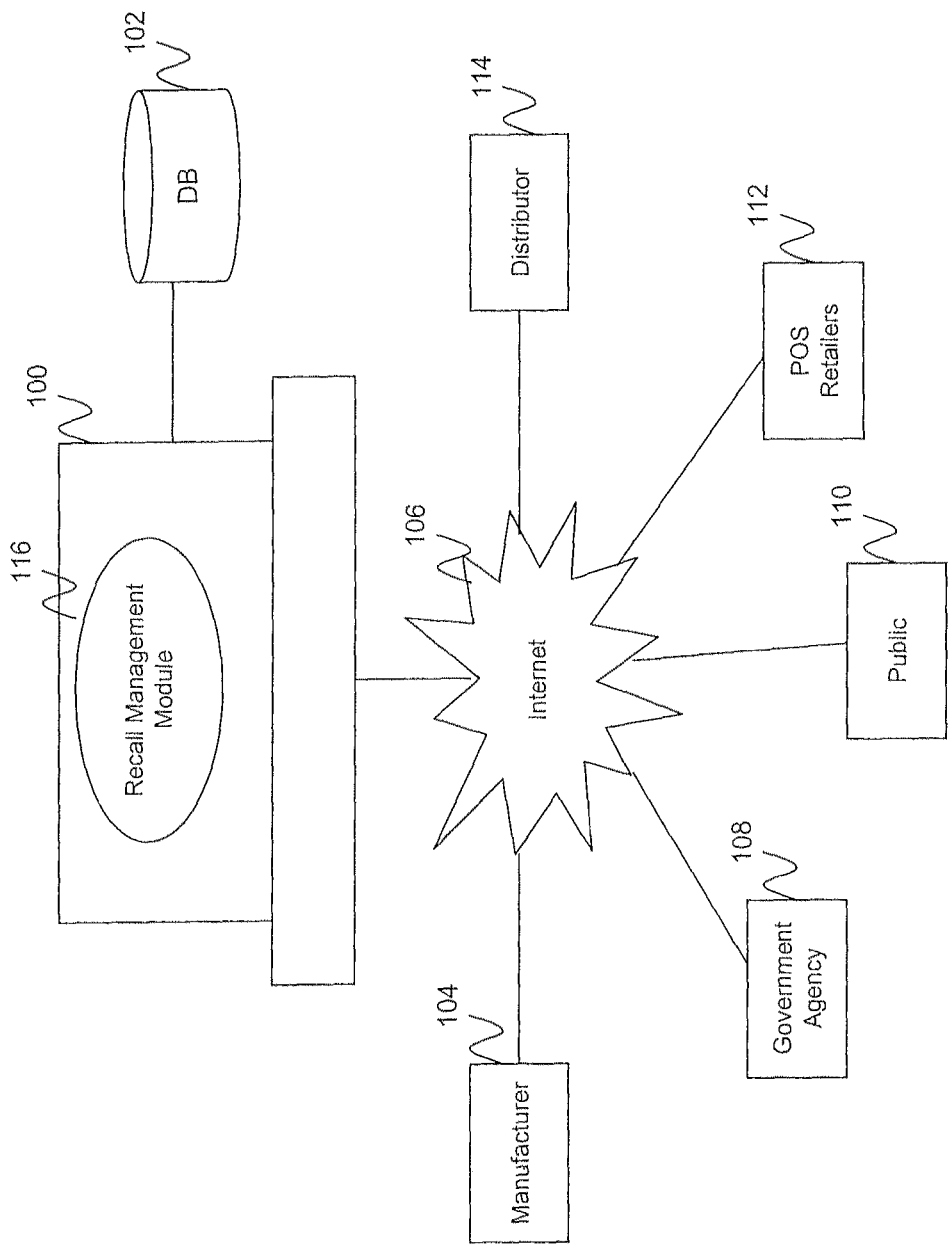
FIG. 6 is a block diagram of a recall monitoring and management system including a central recall server according to one embodiment of the invention.

FIG. 6 is a block diagram of a recall monitoring and management system including a central recall server 100 according to one embodiment of the invention. The recall server 100 is coupled to various end user devices accessible, for example, by manufacturers 104, distributors 114, point of sale (POS) establishments 112, members of the public 110, government agencies 108, and the like, over a data communications network 106 such as, for example, a public Internet.

According to one embodiment of the invention, the server 100 includes a recall management module 116 for managing and monitoring different aspects of a recall process. The recall management module 116 is configured to provide a central website for access by the manufacturers 104, distributors 114, and/or POS establishments 112 to initiate, expand, continue, verify, and/or monitor a product recall. Information and tools provided by the website may differ depending on whether the entity accessing the website is a manufacturer, distributor, or POS establishment. The public 110 and government agencies may also access the website to monitor or obtain information about product recalls.

The recall management module 116 is further configured to automatically transmit notifications to affected and unaffected entities, verify receipt of the notifications, and further process, verify, and account for product removal or other product dispositions of the products in response to the notifications. The recall management module may be implemented via any combination of software, firmware (e.g. an ASIC), and/or hardware as will be apparent to a person of skill in the art. The computer program instructions of the recall management module 116 may further be stored in a computer readable media for installing in any server at any retailer or manufacturer site if the managing and monitoring is desired to be effectuated from those sites.

The server 100 is coupled to a mass storage device 102 such as, for example, a disk drive or drive array, for storing recall database with information used by the server 100 for managing and monitoring the product recalls. For example, the mass storage device may store all information on a recalled product, including notifications transmitted for the recalled product, number of products removed, information surrounding the recall, and the like.

According to one embodiment of the invention, the product recall monitoring process starts with a manufacturer logging-in to the centralized website and entering recall data for a particular recalled product. In this regard, the recall management module provides a data capture wizard that prompts the manufacturer to provide certain standardized information relevant to product recalls. For example, the manufacturer may be prompted to provide a case and product UPC, product name, product description, customer list, and the like. The customer list may identify the customers who have received a recalled product as well as the customers that have not received the recalled product. Such customers may be distributors, POS retailers, the end users, and the like.

The recall management module automatically notifies each customer entered into the system about the recall, and monitors receipt verification from the customers. For example, if the notification is via email, a return receipt from the customer may verify that the customer has received the notification. If no receipt verification is received after a certain time period, the server generates an exception report and transmits the report to the manufacturer. The manufacturer may respond to the exception report by notifying the non-responders on secondary and tertiary devices (or manually if necessary), even while the module continues notification efforts, until all customers have verified receipt of the recall notification. The recall management module also notifies each customer entered into the system who has not received a recalled product that the customer has indeed not received the recalled product.

A customer receives the notification of a recall and accesses the website provided by the recall management module to obtain the product recall information and provide its own information relevant to the recall. A distributor customer enters its own customer list (e.g. POS establishments) as well as any additional recall information relevant to its customers. The customer list may identify both the customers that have received a recalled product as well as customers that have not received the recalled product. The recall management module automatically notifies the POS establishments of the product recall, and monitors for receipt verification by the establishments. An exception report is also generated upon failure to receive the receipt verifications in an allotted time period. The exception report is transmitted to the distributor for follow-up. The non-responding establishments are notified on secondary and tertiary devices (or manually if necessary) until receipt verification is received from all affected establishments. As the establishment completes the product recall, product count information is also transmitted by the establishment to the recall management module for updating the recall information in the mass storage device. The servers monitors the disposition product count to verify that the recall is being complied with. If products are not being disposed of in a timely manner, the server may be configured to transmit follow-up notices and take any other affirmative action to prompt the customers to take the disposition actions.

Government agencies also receive automatic notification of the recall message and may monitor the recall progress by accessing the website provided by the recall server. In addition, members of the public that have subscribed to the website may receive automatic notifications of product recalls. The subscribing members may receive notifications of all recalled products, recalled products in particular categories, or recalled products that they have purchased.

The recall notification that is automatically generated allows the recipients to view the recall information in a manner that is standardized for their particular recipient group. For example, the manner in which the recalled product is identified may differ based on whether the recipient of the information is a distributor, a POS establishment, or the public. A distributor would want the recalled product to be identified by the case UPC. A POS establishment would want the recalled product to be identified by the product UPC. On the other hand, the consumer would want the recalled product to be identified by the product name. In order to achieve this, the recall management module processes the recall information according to predetermined policy rules to extract and format the information to standardize the information for the particular recipient group.

The server is also configured to monitor different aspects of the recall process and generate recall reports based on the monitored information. For example, the server is configured to collect time and date stamps of recall messages from the manufacturers and distributors, time and date stamps of receipt verifications from the distributors and POS establishments, and time and date stamps associated with product disposition quantities. In addition, the server tabulates the product volume removed from the supply chain in response to product removal information provided by the distributors, POS establishments, and the like, and includes this information in the report. The server may also be configured to compile information on business entities holding recalled products, and automatically transmit this information to central registries such as, for example, the FDA Adulterated Food Registry. For example, the server is configured to automatically extract certain information collected in its database for a particular recall, format this information into a from required by the FDA, and provide the information to the FDA The following is a more detailed description of the recall monitoring and management process according to one embodiment of the invention. For the purposes of this description, the recall initiator is described as being a manufacturer even though recalls can be initiated at any node within the supply network. Multiple distributors may be involved in moving recalled product from the manufacturer to the ultimate POS. According to one embodiment of the invention, a POS establishment includes, but is not limited to, retail food stores, restaurants, institutional feeding facilities, c-stores, and the like. Distributors play both the role of customer and distributor in this invention, receiving recall notification as a customer and sending recall messages as a distributor.

FIGS. 1-5 are functional process diagrams of an overall process for recalled product inventory notification, removal, and verification according to one embodiment of the invention.

Step 1: After the manufacturer decides that a recall is required, the manufacturer accesses a recall website provided by the recall server 100 through secure access with log in and password. The website is pre-populated with identifying information based on the user.

Figure 8A:
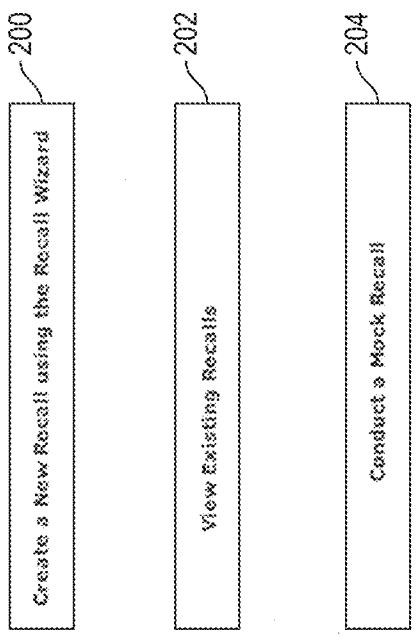

FIG. 8A is a screenshot of a graphical user interface (GUI) displayed to a manufacturer for creating a recall, viewing existing recalls, and conducting mock recalls according to one embodiment of the invention. The manufacturer chooses a Recall Wizard option 200 to be guided through the process of creating a recall bulletin to initiate a recall. The manufacturer may also select an option 202 for viewing existing recalls, and option 204 for conducting a mock recall.

The first stage of the Recall Wizard is the entry of item specific information for a recall event. FIG. 8B is an initial screenshot of a GUI for generating the recall event according to one embodiment of the invention. Entering item specific information can be done manually, or uploaded from a database (internal or external), or through other electronic processes. According to one embodiment of the invention the recall initiator provides a name of the recall event 206 along with a recall effective date 208. Other relevant information such as a time frame for response 210, government agency regulating the recall, informational web sites, product disposition instructions, recall classification, and the like, also are input for the recall event through the data capture wizard. Additional information such as reason for the recall, press release, question and answer information, etc. can be entered manually, uploaded, or imported via any electronic mechanism to the recall server 100.

Figure 8C:
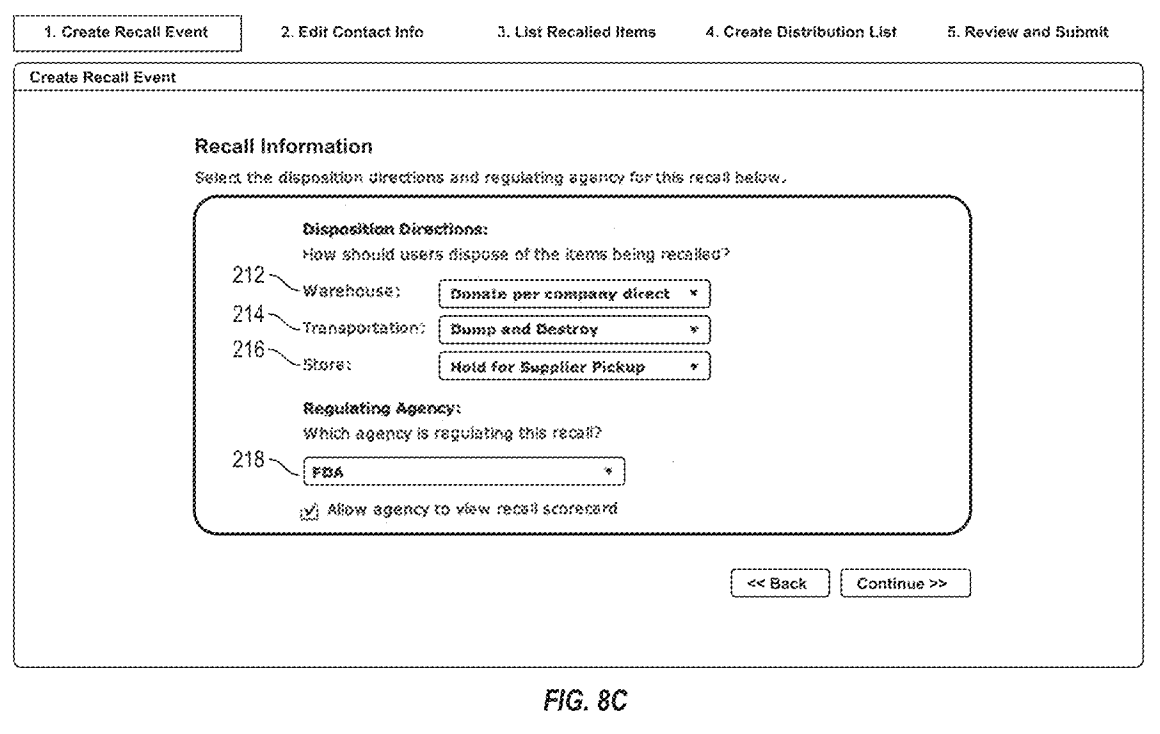

FIG. 8C is a screenshot of a GUI for entering product disposition instructions according to one embodiment of the invention. According to one embodiment of the invention, the product disposition instructions may prompt the recipient of the recall notification to take the recalled products to a specific warehouse location 212, destroy the products 214, or hold the products for supplier pickup 216. The product disposition instructions may further indicate a government agency 218 that is to regulate the recall. Access may be provided to this government agency to monitor progress of the recall via the recall scorecard.

FIG. 8D is a screenshot of a GUI for generating recall distribution messages according to one embodiment of the invention. According to one embodiment, the recall initiator may transmit different messages depending on the recipient who is receiving the notification. A message for affected customers 222 provides information for accessing the recall management module 116 for continuing the recall, generating reports, providing product disposition updates, and the like. A message for unaffected customers 224 may be a confirmation that those customers are not affected by the recall event. Internal messages 226 may also be generated for providing information to internal customers, employees, and the like.

The Recall Wizard takes the manufacturer to stage two of data capture, the listing of company contact information that can be used by its customers to answer specific questions about the recall event such as questions about product credits, returns, or transportation points. FIG. 8E is a screenshot of a GUI for providing the manufacturer's contact information according to one embodiment of the invention.

The Recall Wizard brings the manufacturer to stage three of the data capture process where item information is entered for product(s) being recalled. FIG. 8F is a screenshot of a GUI for entering specific recall items for a recall event according to one embodiment of the invention. Item information can be entered manually, one item at a time, upon selection of option 230 and entering of prompted information in box 232, or uploaded to enter multiple items simultaneously upon selection of option 234. According to one embodiment of the invention, the recall specific information (e.g. item UPC, sell-by or use-by date, lot code) is provided by the manufacturer. Other item information (e.g. product description, product image, etc.) can be entered manually or uploaded, or retrieved from external databases in standardized formats. Total quantities of distributed product are also captured in a quantity shipped field 236. According to one embodiment of the invention, one or more fields of the GUI provided by the Recall Wizard to receive information for a recall event are linked to fields in one or more template forms that need to be submitted, for example, to government agencies, to allow the automatic completion of at least some of the information required by those forms.

The Recall Wizard moves to stage four of its process and allows the manufacturer to enter a customer list (which may include POS customers who buy directly from the manufacturer), include a designation of those customers on the list that received the recalled product and the amount they received. FIG. 8G is a screenshot of a GUI for entering the customer information. The customer list captures customer data such a name, company name, identifying image, e-mail address, phone number, etc. Both a customer type (i.e. distributor, POS, internal, government) and customer status (affected, non-affected, internal) can be selected from menus in the data capture wizard and associated to individual customers or customer groups. These designations allow the recall server 100 to send different messages to different customer types as well as to customers with different statuses in the recall. The customer list can either be entered manually or uploaded to the recall server 100 by selecting option 238.

Figure 8H:
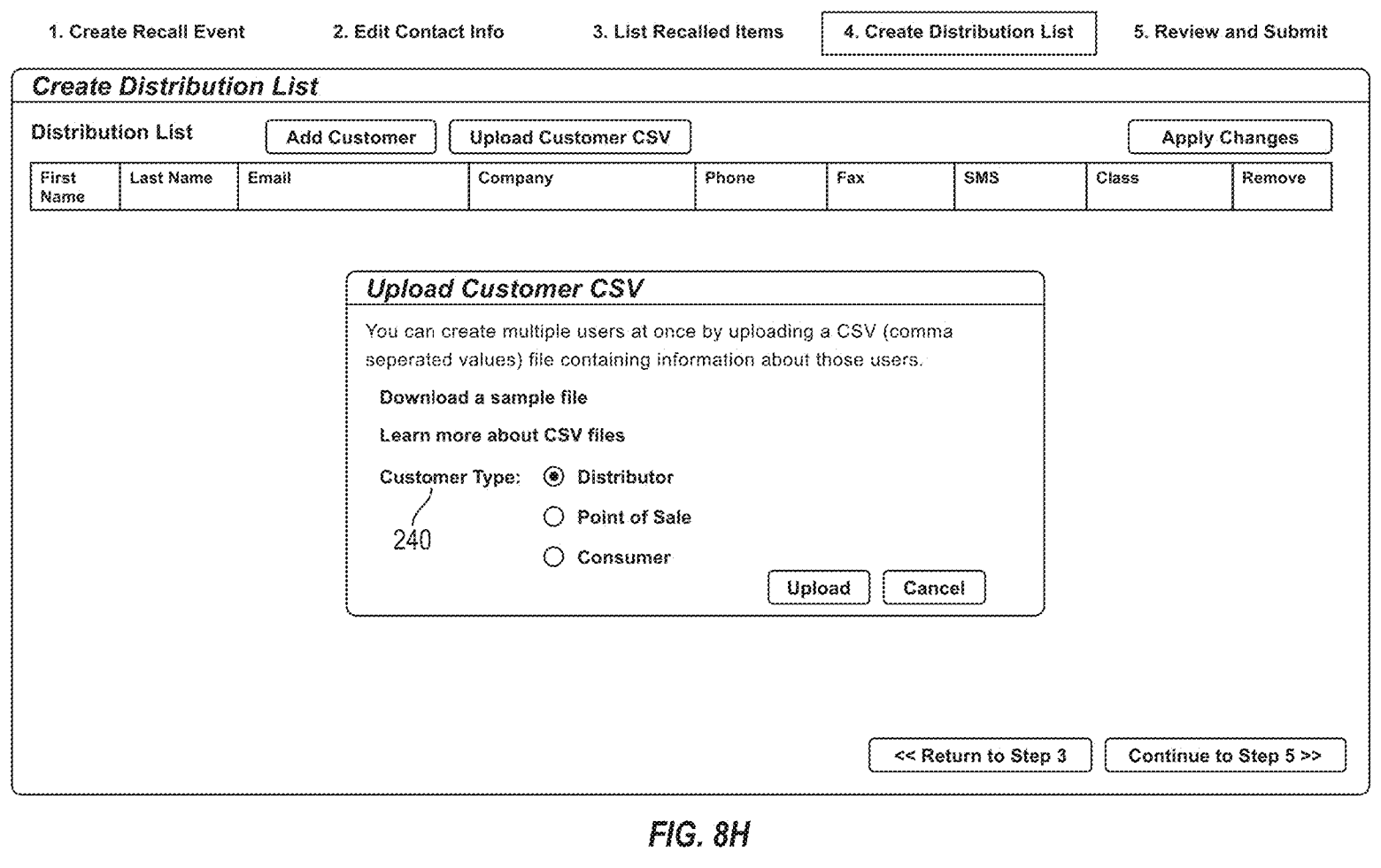

FIG. 8H is a screenshot of a GUI for uploading a customer list according to one embodiment of the invention. According to this embodiment, the entity uploading the list selects a customer type from various available customer types 240. The selected customer type is then assigned to all the customers included in the customer list.

The Recall Wizard moves to stage five of its process and allows the manufacturer to verify all data entered for the recall event. After verification, the Recall Wizard allows the manufacturer to initiate the recall by selecting option 242 as shown in FIG. 8I.

Step 2: Once the recall is initiated, the recall server 100 begins notifying customers on the distributor list of a recall from the manufacturer using an automated message. At this step, the recall management module is configured to differentiate between customer type (distributors, POS) and customer status (affected, non-affected, internal) that received recalled product, and those that did not. The recall management module 116 is configured with computer program instructions that evaluate manufacturer supplied data that indicates which customers were shipped what quantity of recalled product. The quantity information may be used to identify the customer type. For example, a customer receiving a quantity of zero for a recalled product is identified as being "not affected." Alternatively, a specific customer type identifier may be associated to each customer for designating their type. For those customers with a non-affected designation, a "not affected" message is sent. According to one embodiment, every entity on the distributor list receives a message that either directs customers to the recall server 100 for product and recall information for those affected by the recall, or notifies customers that they received no recalled product from the manufacturer. (Though a customer is not affected directly from the manufacturer, it may be affected by recalled product received from secondary sources of distribution.) The automated message also allows customers who don't have access to the Internet to specify a secondary method for receiving recalled product information.

The recall server 100 both notifies customers as directed by the distributor list, and keeps track of customer notification receipts.

Step 2a: These receipts are captured by the recall server 100 and stored in the recall database for automatically generating exception reports of customers that haven't received notification after a specified time interval. The exception reports are sent automatically from the recall server 100 to the manufacturer at specific time intervals to allow for additional efforts at customer contact.

Step 3: Customers log onto the recall server 100 (or other designated means) to get product recall information in response to the received notifications. If the notifications are via email, the email contains a link to the specific product recall (or specific version of the product recall if multiple versions exist).

FIG. 9A is a screenshot of an exemplary recall notification received by a customer via email according to one embodiment of the invention. The email message provides a link 250 to the server 100 for accessing information on the recall. If the recipient is a first time user of the system, the email notification provides a login email 252 and password 254 for initial access to the system. The user may change the password, for example, once he or she access the system.

The email further includes a link 256 which, when selected, transmits a message to the server of receipt of the email. When the recall management module receives selection of the link 256, it updates the status of the responding customer as having been confirmed. The recall management module tracks those customers who have confirmed receipt of the recall notification to determine whether follow-up messages need to be transmitted.

Step 4: FIG. 9B is a screenshot of a website access page provided by the server 100 upon selection of link 250 according to one embodiment of the invention. When customers log onto therecall web site, the customers are brought into a Recall Response Wizard that recognizes their customer type. The Recall Response Wizard provides general product recall information, as well as specific recall event information including disposition directions particular to customer types.

Step 5: Distributors who are affected by the recall log onto the recall server 100 using a login email and secure password. The recall server 100 recognizes the customer type, and automatically brings the customer into the Recall Response Wizard appropriate to its type so that it can verify inventory removal, and continue the recall information to its unique customer list.

FIG. 9C is a screenshot of a recall information page displayed to a distributor according to one embodiment of the invention. The Recall Response Wizard includes pre-populated recall information that came directly from the manufacturer, and specific recall information that they need to pass to their customers to facilitate proper recall execution. In this manner, information on recall progress and other information relevant to the recall is compiled from different sources in different levels of the product distribution chain.

After reviewing the Recall Event information in stage 1, the Recall Response Wizard steps the distributor through a series of screens to verify the amount of recalled product removed from inventory, and to prepare the system to continue the recall onto additional customers. Stage two of Recall Response Wizard shows the customer contact information from the manufacturer that can help with specific aspects of the recall (credit requests, supply chain information, etc.). Stage three provides fields for the distributor to enter its own contact information that can be used by its customers when processing the recall.

Stage four allows the distributor to tailor the recalled item information for its customers, and to enter the amount of product shipped to customers as well as the amount of product removed from sale in response to the recall event. FIG. 9D is a screenshot of a GUI provided to a distributor for entering this information according to one embodiment of the invention. If none of the recalled products were shipped to the distributor's customers, a quantity of 0 is entered in field 260.

The Recall Response Wizard brings the distributor to Stage five where customer data is entered. Customers can be entered individually or uploaded from a file; they can be designated by type (distributor, POS) and by status (affected, non-affected, internal, government) similar to what is done by the manufacturers as described with reference to FIGS. 8G-8H. The customer list (which may include other distributors who buy from the notifying distributor) includes designation of the customers' status, and for customers that received the recalled product, the amount they received. This designation allows the recall server 100 to send different messages to affected as opposed to non-affected customers.

FIG. 9E is a screenshot of a GUI for generating messages for different types of customers according to one embodiment of the invention. At this step, the recall management module 116 evaluates the customer status data to differentiate between customers that received recalled product, and those that did not. Based on customer status, the recall server 100 sends appropriate messages to all customers on the distribution list. (Though a customer is not affected directly from the distributor, it may be affected by recalled product received from other sources of distribution.) The automated message also allows customers who don't have access to the Internet to specify a secondary method for receiving recalled product information. The customer list can either be entered manually, imported, or uploaded via any electronic mechanism to the recall server 100.

The Recall Wizard moves to stage six of its process and allows the distributor to review and edit the message that will be used to notify customers of the recall event. After review, the Recall Wizard asks the distributor to continue the recall communication upon selection of option 270. Selection of option 270 further updates the customer's status as having verified the recall.

Figure 9G:
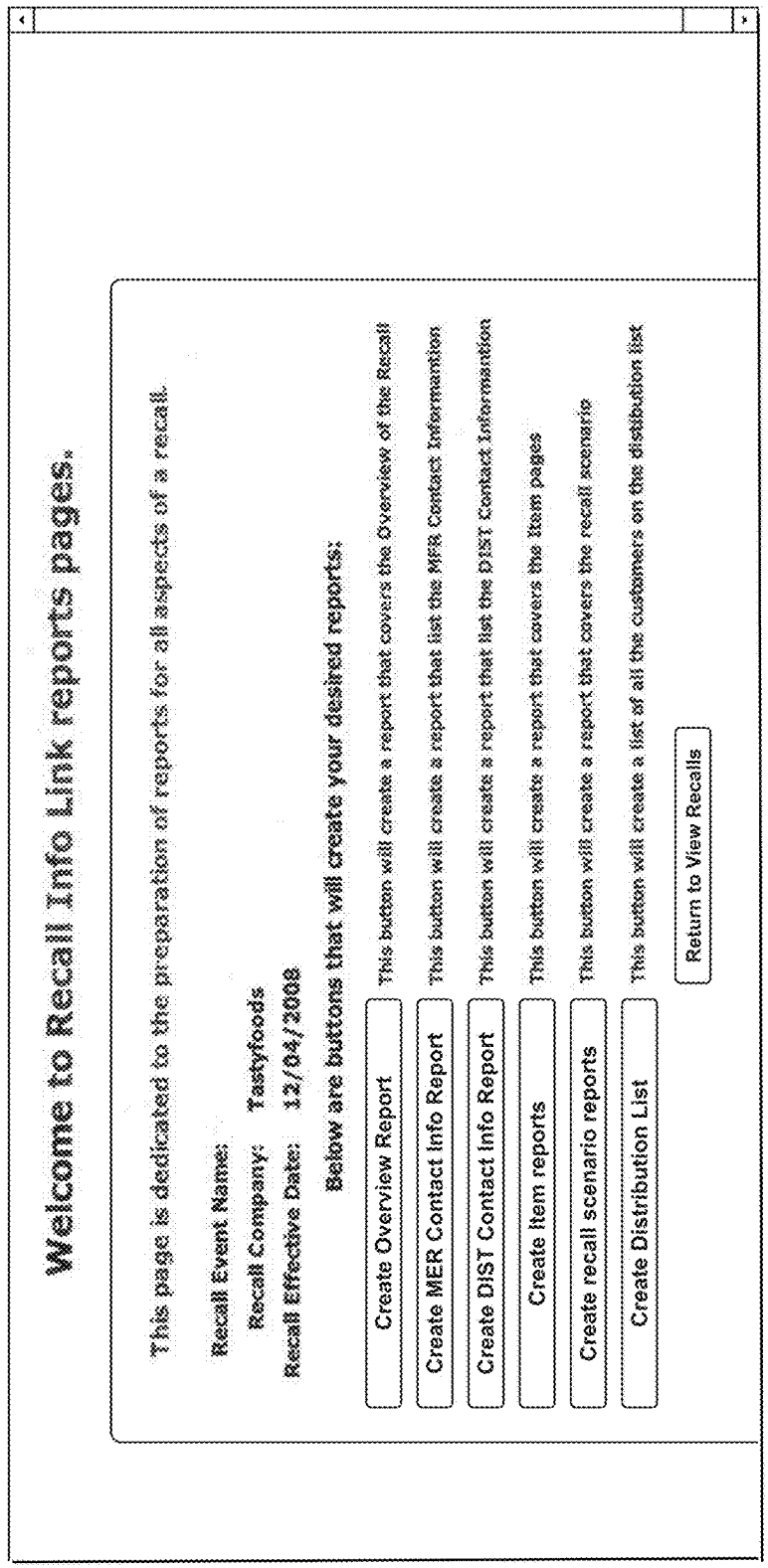

FIG. 9F is a screenshot of a GUI that is displayed upon selection of a home option 272 according to one embodiment of the invention. The GUI provides information of various recall events for which the particular customer has been notified, and the status 278 of each recall event. The GUI further provides a link 274 for continuing or updating product disposition information for each recall. A scorecard link 276 causes display of a scorecard with specific information on the progress of the recall. A reports link 280 causes display of various reporting options such as the ones shown in the screenshot of FIG. 9G.

Step 6: Once the recall is continued, the recall server 100 begins notifying customers on the customer list generated by the distributor of a recall from the manufacturer using an automated message. The message directs customers to the recall server 100, or other designated location, for product information including proper disposition of recalled product, press release(s), Q & A information, contact information, etc. The automated message also allows customers who don't have access to the Internet to specify a secondary method for receiving recalled product information.

The recall server 100 both notifies customers as directed by the customer list, and keeps track of customer notification receipts.

Step 6a: These receipts are captured by the recall server 100 and stored in a database that automatically generates exception reports of customers that haven't received notification after a specified time interval. The exception reports are sent automatically from the recall server 100 to the distributor to generate additional efforts at customer contact.

Step 7: When customers log onto the Recall InfoLink web site, the server recognizes their customer type, and automatically brings them into the Recall Response Wizard appropriate to their type so that they can verify inventory removal, and continue the recall information to their unique customer list if required. The Recall Response Wizard provides general product recall information, as well as specific recall event information including disposition directions particular to customer types. Distributors who are affected by the recall log onto the recall server 100 using a log in and secure password and follow the procedures described in steps 5 and 6 above.

Step 8: When the recall server 100 recognizes the POS customer type, it automatically brings the customer into the Recall Response Wizard appropriate to its type so that it can verify inventory removal. FIG. 10A is screenshot of a recall information page displayed to a POS customer according to one embodiment of the invention. The Recall Response Wizard includes pre-populated recall information that came directly from the manufacturer, and specific recall information from the distributor to facilitate proper recall execution. In this manner, information on recall progress and other information relevant to the recall is compiled from different sources in different levels of the product distribution chain.

After reviewing the Recall Event information in stage 1, the Recall Response Wizard steps the POS establishment through a series of screens to verify the amount of recalled product removed from inventory. Stage two of Recall Response Wizard shows the contact information from the manufacturer that can help with specific aspects of the recall (credit requests, supply chain information, etc.). Stage three shows the contact information from the distributor that can be used when processing the recall.

Stage four allows the POS establishment to quantify the amount of recalled items removed from sale in response to the recall event. FIG. 10B is a screenshot of a GUI provided to a POS establishment for entering product removal information 400 for one or more products of the notified product recall event according to one embodiment of the invention. When the amount of product removed is entered into the recall server 100 through the recall web site or other designated entry point, and the entered information is transmitted to the server upon selecting option 402, the recall server 100 tabulates the removed product and displays it in the manufacturer and distributor scorecards. According to one embodiment of the invention, a date and time is in which option 402 was selected is also stored in the database and associated with information on a current quantity removed. According to one embodiment of the invention, additional notifications may be transmitted to the POS establishment if an established period of time elapses without verification on the removal of the recalled items.

Step 9: Distributor and POS establishments can re-enter the Recall Response Wizard and update the quantity of product removed in response to the recall if additional product is recovered or returned over time. For example, the POS establishment may re-enter the wizard upon selecting link 500 for a specific recall event as shown in FIG. 10C.

Figure 7:
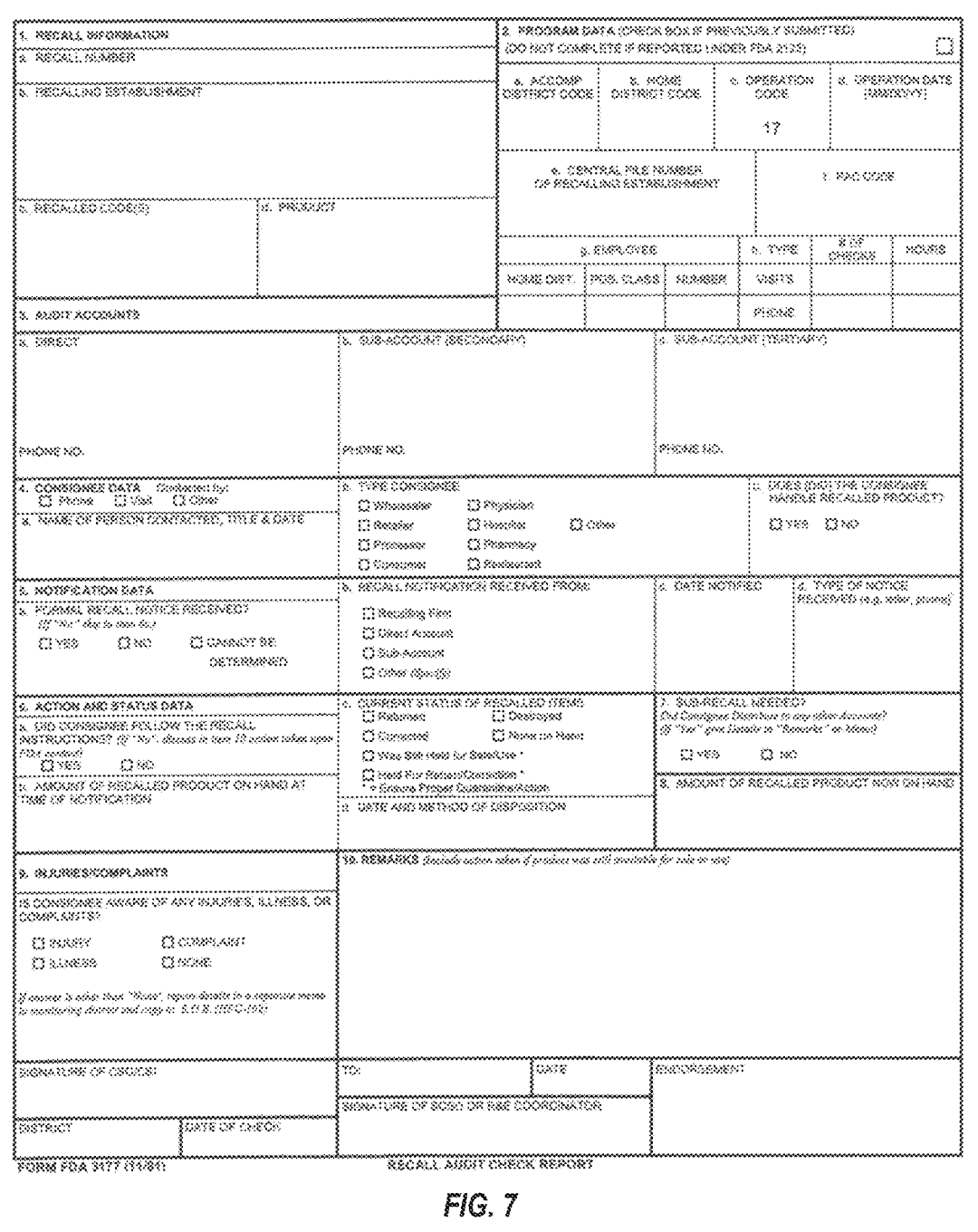

Step 10: Government agencies are automatically notified of recall initiation, and prompted to log on to the recall server 100 for detailed information, including monitoring the progress of recalls from manufacturers that have opted to allow such regulatory monitoring. According to one embodiment of the invention, the recall management module 160 is configured to provide government agencies access to completed forms, reports, and registries that comply with specific agency requirements. For example, the recall server configures data entered by the manufacturer into predetermined formats as specified by the regulatory body, and automatically fills out form templates (e.g. FDA form 3177 as illustrated in FIG. 7). These forms may be accessed, for example, from the page illustrated in FIG. 9G which lists the different types of reports provided by the system. The forms are automatically transmitted to the government agencies, or stored at the server for retrieval by the manufacturer, government agency, or the like. The Adulterated Food Registry, as another example, is completed through repetitious iterations of data input from multiple product suppliers. Each product supplier (manufacturer(s) and/or distributor(s)) enters its list of businesses affected and unaffected by the recall as the recall is initiated and continued. The recall server 100 then compiles the lists of businesses that received recalled product (distributor(s) and/or POS customer(s)) through primary or secondary distribution channels, diversion, electronic commerce, etc. to complete the Registry.

Step 11: Public subscribers to Recall InfoLink receive notification of recalls as requested, and are directed to the recall server 100 for recall information, including product disposition directions. From the recall server 100, the public is able to access lists of POS establishments (grocery stores, c-stores, restaurants, feeding institutions, electronic shopping, etc.) that have received recalled product in their particular shopping area.

Step 12: The public may enter the amount of recalled product they disposed of into the recall server 100 which tabulates removed product for the manufacturer.

Step 13: The manufacturer or distributor can enter the recall server 100 at any time and search for an existing recall that is already in the system, whether new or already acted on to review the details of the recall event, view the scorecard or print system-generated reports.

Step 14: The manufacturer can enter the recall server 100, and expand an existing recall to include additional items, additional customers, or both as needed based on internal review, external input, or regulatory requirements.

The recall management module is configured for recall expansion which allows successive versions of a previously initiated recall to be created and maintained in a way that allows for both independent tracking/reporting, and combined tracking/reporting of each recall version. Expanding a recall first requires access to an existing version(s) of a recall from the recall data warehouse. In this regard, a recalling entity searches for a specific recall identifier, such as, for example, a product name, recall ID, time frame, UPC, or other identifying data.

Next, a recall expansion may entail adding new products, new distributors, new customers, new regulatory agencies, or any combination of these properties, and saving this information as a new version of the existing recall. For instance additional distributors or customers may need to be added to a version of a product recall that has already been initiated and/or continued. Likewise, new products may need to be added to an existing recall that may apply to the same distributors/customers already notified, or a new set of distributors/customers that may include distributors/customers already notified, new distributors/customers, or any combination of the two.

Each version of an existing recall may be associated with a timestamp that identifies when the new version of the recall was created. Saving any modification to an existing recall as a new version ensures that prior versions of the recall are maintained. It is desirable to maintain the prior versions because the reporting of recall execution to regulatory agencies and for business credit or other financial purposes may need to be different by version if each version has different distributors/customers included and products (i.e. version 1 has distributor A, customer AA, product AAA; version 2 has distributor B, customers AA, BB, and CC, products AAA and BBB), to allow for monitoring recall versions and their unique aspects. For example, a list of products and businesses involved may expand over time as new products and channels of distribution are identified through regulatory investigation, additional illnesses, or consumer complaints. In each of these cases, each "version" of the recall may be linked to earlier versions from business, regulatory, and legal standpoints. Reporting the actions taken (response, product removed, etc.) may be specific to a particular "version" of the recall (that is, a particular business for regulatory or liability purposes) or the entire action as a whole (that is for regulatory reporting purposes, liability purposes, business credit purposes).

Next, new messaging to communicate the recall expansion that references the earlier version(s) of the recall is used to notify customers of the recall expansion. Inputs of products removed and/or disposed of are maintained both as responses to a particular recall version, and tabulated as part of the entire recall from its inception. Recall monitoring can specify recall version(s) or the combined total recall.

Step 15: The manufacturer, distributor, or Public can re-enter the recall server 100 at any time, search for an existing recall, view details of existing recall events, view scorecards of recall events, print reports, and record additional recalled product captured or disposed of which will then be added to the ongoing tally of product quantity recovered against product quantity distributed.

Step 16: At any time, the manufacturer can enter the Recall InfoLink web site to manage mock recalls. Mock recalls can be scheduled ahead of time or conducted without scheduling. FIG. 11 is a screenshot of a GUI for conducting mock recalls according to one embodiment of the invention. A series of mock recall steps 600 are provided to guide the manufacturer through a comprehensive mock recall exercise. The Mock Recall Wizard captures relevant company information (i.e. mock recall participants, cc list for notification, company contact information, etc.) that is saved in the recall database, and is accessible as needed for additional mock recalls or recall events. An e-mail reminder of the scheduled mock recall event is sent to the manufacturer at an amount of time before the mock recall specified by the manufacturer. Conducting mock recalls allows a manufacturer to gather ahead of time the information that will be needed if a real recall has to be conducted. Mock recalls further allow the manufacturer to familiarize him/herself with the recall system to efficiently and expeditiously conduct a real recall should this ever be necessary.

At each communication point resulting from a recall event initiation and a recall event continuation, the message/website information provided to each audience is tailored to that audience so that the message can be acted on and/or replied to rapidly. According to one embodiment, distributors receive messaging as input by the manufacturer as it accurately describes what distributors received. POS establishments receive messaging as input by the distributor as it depicts what POS establishments received from the distributor (pack size, item number, and other specifics may differ significantly from what the manufacturer inputs). The reason for the recall, product description, UPC, case pack, lot codes, item numbers, and product disposition are prominent in this communication. The public receives messaging that highlights the relevant portions of the recall bulletin (i.e. product description, UPC, reason for the recall, health hazard information), and omits the less meaningful information (i.e. quantity shipped, case pack, some contact information, etc.) The proper messaging is automatically determined by the recall server based on the identification of the target audience, and rules associated in generating recall notices to the target audience. The reason for the recall, product description, UPC, and disposition direction (different from other disposition directions) are prominent in this communication.

According to one embodiment of the invention, the government messaging contains significant portions of both manufacturer and distributor information that will give visibility to recall scope and product distribution. Some of the input information will also be deleted, such as credit contact, which has no value for regulatory agencies. Again, this is automatically determined by the recall server based on the identification of the target audience receiving the messaging.

According to one embodiment of the invention, a product recall may be deemed to have been completed upon detection of certain triggering events by the recall server (e.g. removal of a certain percentage of recalled items, certain passage of time, indication that all entities affected by the recall have confirmed receipt of a recall notice, and the like). The recall server may be configured to tag a particular recall as completed (or provide some other status identifier) in response to the trigger event.

Figure 12:
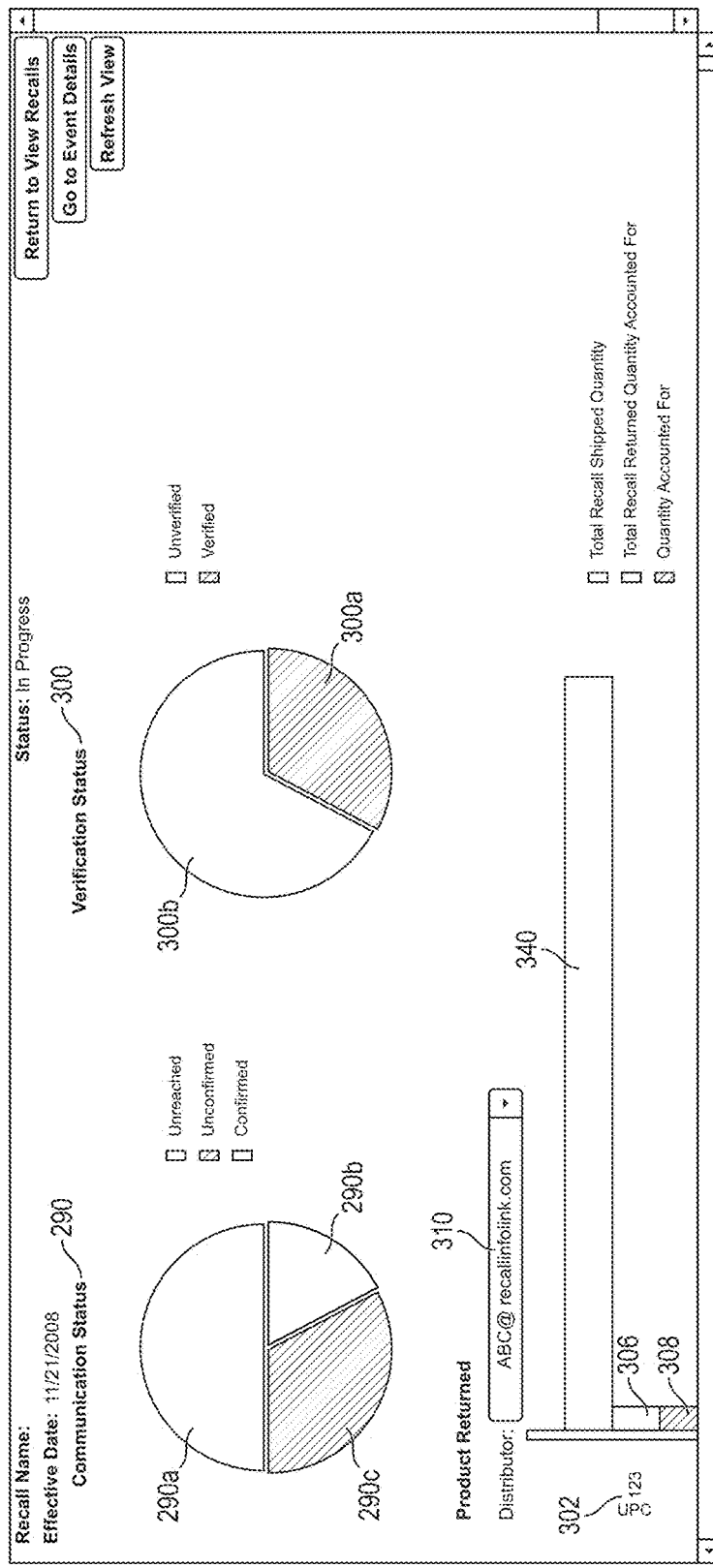
FIG. 12 is a screenshot of an exemplary scorecard for an entity initiating or continuing a product recall according to one embodiment of the invention

FIG. 12 is an exemplary screenshot displaying a scorecard for a particular entity generating or continuing a recall according to one embodiment of the invention. The scorecard includes real-time communication status information 290 indicating graphically, numerically, or otherwise, those customers who remain unreached 290*a* (i.e. no recall notifications have been transmitted to them), those customer who are confirmed 290*b* (i.e. recall notification have been transmitted, and receipt has been confirmed), and those customers who are unconfirmed 290*c* (i.e. recall notification have been transmitted, but receipt has not been confirmed).

The scorecard further includes real-time verifications status 300 indicating graphically, numerically, or otherwise, those confirmed customers who have verified 300*a* the recall or not 300*b*. As an example, a distributor who goes through the various stages of the recall wizard to provide further recall information and who then selects option 270 (FIG. 9E) causes verification of the recall.

The scorecard further includes real-time product disposition information for each recalled product as identified by a product ID 302. Bar 304 identifies a total number of the recalled product that was shipped by the particular entity to whom the scorecard applies. Bar 306 identifies the total recall returned quantity that is accounted for by the particular entity, and bar 308 identifies a quantity that was disposed by a particular customer identified in field 310 to whom the product was shipped by the particular entity.

Figure 13:
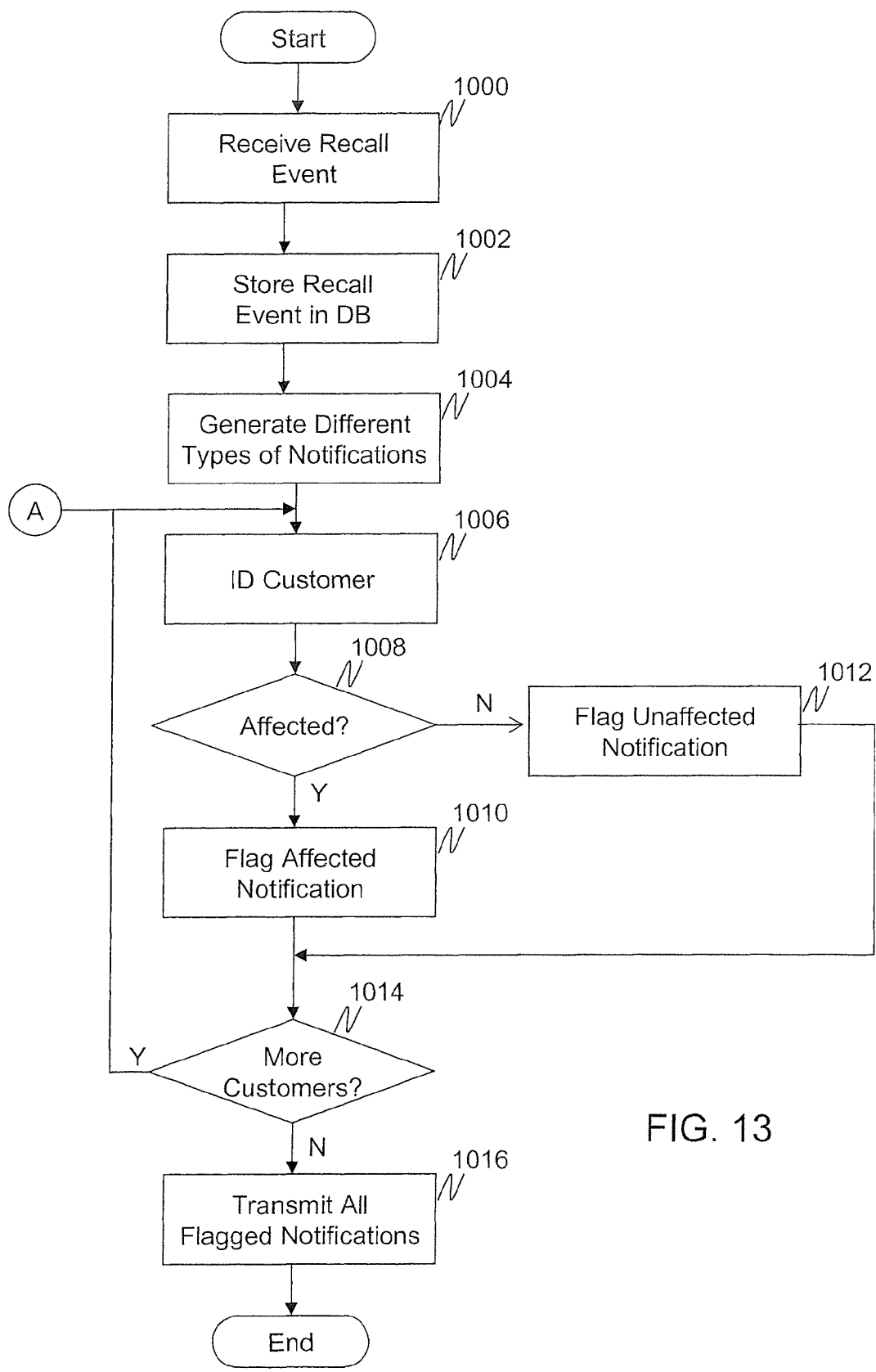
FIG. 13 is a flow diagram of a process for creating a recall event according to one embodiment of the invention.

FIG. 13 is a flow diagram of a process executed by the recall management module 116 for creating a recall event according to one embodiment of the invention. The process starts, and in step 1000, the recall management module 116 receives a recall event generated by a recall initiator. According to one embodiment of the invention, the recall initiator is a manufacturer of the product to be recalled. A person of skill in the art should recognize, however, that any other entity downstream of the manufacturer may also initiate and/or add to a recall event.

In generating the recall event, the recall initiator submits to the recall management module 116 information about one or more products to be recalled, recall reason and description, effective date of the recall, product disposition instructions, time frame for disposing the products, customers to notify, and the like. The product disposition instructions may prompt a recipient of the recall to take the recalled products to a specific location, destroy the products, or hold the products for supplier pickup. After the recall event is generated, it is stored in the recall database as indicated in step 1002.

In step 1004, the recall management module 116 proceeds to generate different types of notifications that may be sent for the particular recall event. The notifications may vary depending on whether the entity to be notified is affected by the recall, unaffected by the recall, or is an internal notification to be distributed to employees or other internal contacts of the recall initiator. The notifications to affected customers may function as an alert to prompt those customers to dispose the recalled products according to the product disposition instructions. The notifications to unaffected customers, on the other hand, may serve as an assurance that they did not purchase the recalled products, but caution them that they should double check their inventory to ensure that they are not in receipt of the recalled product.

In step 1006, the recall management module 116 proceeds to identify the customer to whom a recall notification is to be transmitted. According to one embodiment, the customer name, customer type (distributor, POS, etc.), quantity purchased, and the like, is provided by the recall initiator when the recall event is generated. This information may be entered by the recall initiator one by one with the generating of the recall event, or uploaded to the system in a single file. Alternatively, the recall management module 116 automatically identifies the relevant customers by examining a purchase database maintained by the recall initiator. Such purchase database may maintain up-to-date sales information of all products sold by the recall initiator including sale date, sale quantity, and recipient information, and the like.

In step 1008 the recall management module 116 determines whether the identified customer is affected or not by the recall event. If the identified customer is affected by the recall event, the notification generated for affected customers is flagged for the identified customer in step 1010. If the identified customer is not affected by the recall event, the notification generated for the non-affected customers is flagged for the identified customer in step 1012. According to one embodiment of the invention, the recall management module 116 determines whether a customer if affected or not by examining the amount of the product purchased by the customer. If the quantity information is 0 for the particular customer, the non-affected notification is flagged. According to another embodiment, the recall initiator may specifically flag each customer with a flag identifying the customer as affected, unaffected, or internal, when generating the recall event.

In step 1014, a determination is made as to whether there are more customers to whom notifications should be sent. If the answer is YES, the process returns to step 1006 for identifying the customer and flagging the appropriate notification for that customer.

In step 1016, the recall management module 116 transmits all flagged notifications to the identified customers. According to one embodiment of the invention, the date and time in which the notifications are transmitted is recorded in the database for monitoring timeliness of acknowledgments, recall completions, and the like. The notifications may be email notifications, instant messaging notifications, telephonic notifications, and/or the like.

Figure 14:
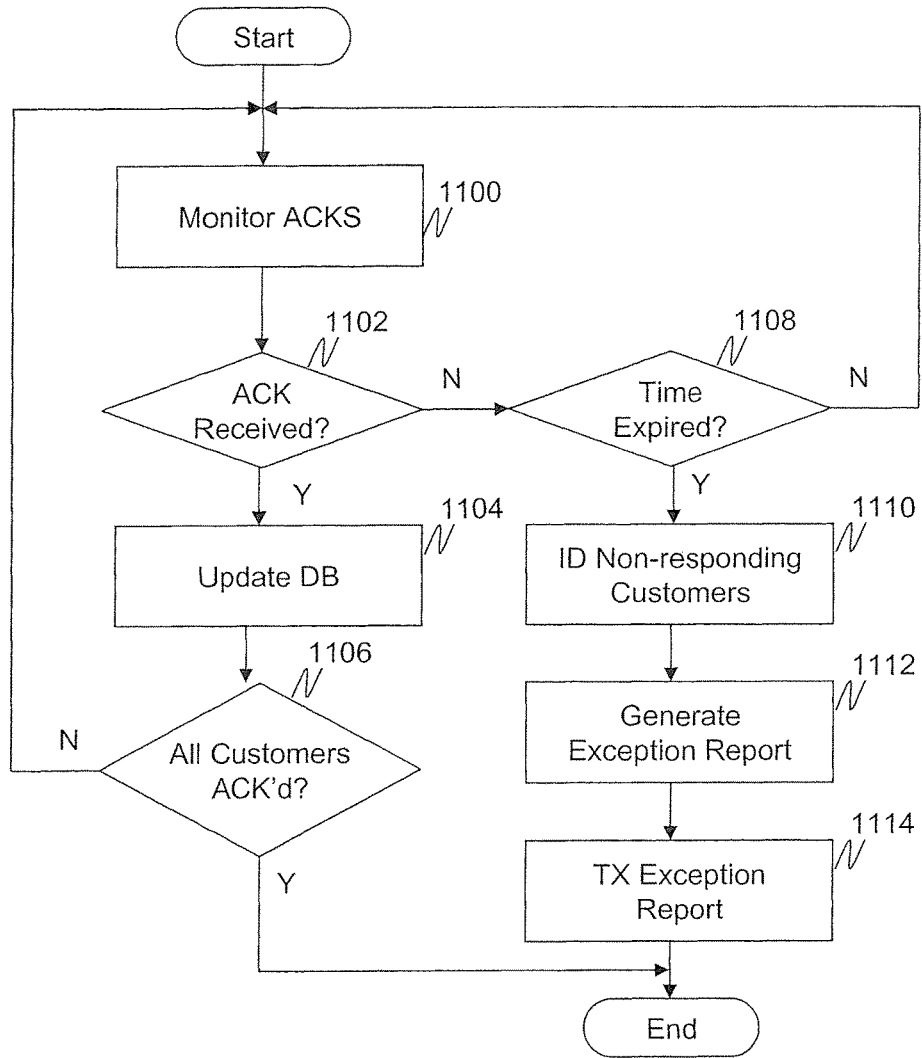
FIG. 14 is a flow diagram of a process for monitoring notifications sent for a particular recall event according to one embodiment of the invention.

FIG. 14 is a flow diagram of a process executed by the recall management module 116 for monitoring notifications sent for a particular recall event according to one embodiment of the invention. The process starts, and in step 1100, the recall management module 116 monitors the recall event for receipt of acknowledgments from different customers. Such acknowledgements may be, for example, acknowledgments that the customers have received an initial recall notification. The recall management module 116 may also monitor for other types of acknowledgments and verifications, including, for example, verifications of a recall event, recall completion notices, and the like.

In step 1102, a determination is made as to whether an acknowledgment has been received in response to the recall notification. The acknowledgment may be in the form of an email notification or any other type of communication convention in the art. If the answer is YES, the recall management module 116 updates the recall database in step 1104 to record the acknowledgment. In this regard, the recall management module 116 records the specific customer transmitting the acknowledgment, the date and time of the acknowledgement, and the like.

In step 1106, a determination is made as to whether all notified customers have transmitted a receipt acknowledgment. If the answer is NO, the process continues to monitor for further acknowledgments. If the acknowledgments are not received in an allotted time frame as determined in step 1108, all non-responding customers are identified in step 1110. In step 1112, an exception report is generated with information about the non-responding customers. The exception report is transmitted, in step 1114, to the entity that caused the recall notifications to the transmitted. That entity may then follow-up with the non-responding customers by transmitting follow-up notifications. The recall management module 118 may select a communication medium other than the communication medium used for the initial notification in transmitting the follow-up notification.

Figure 15:
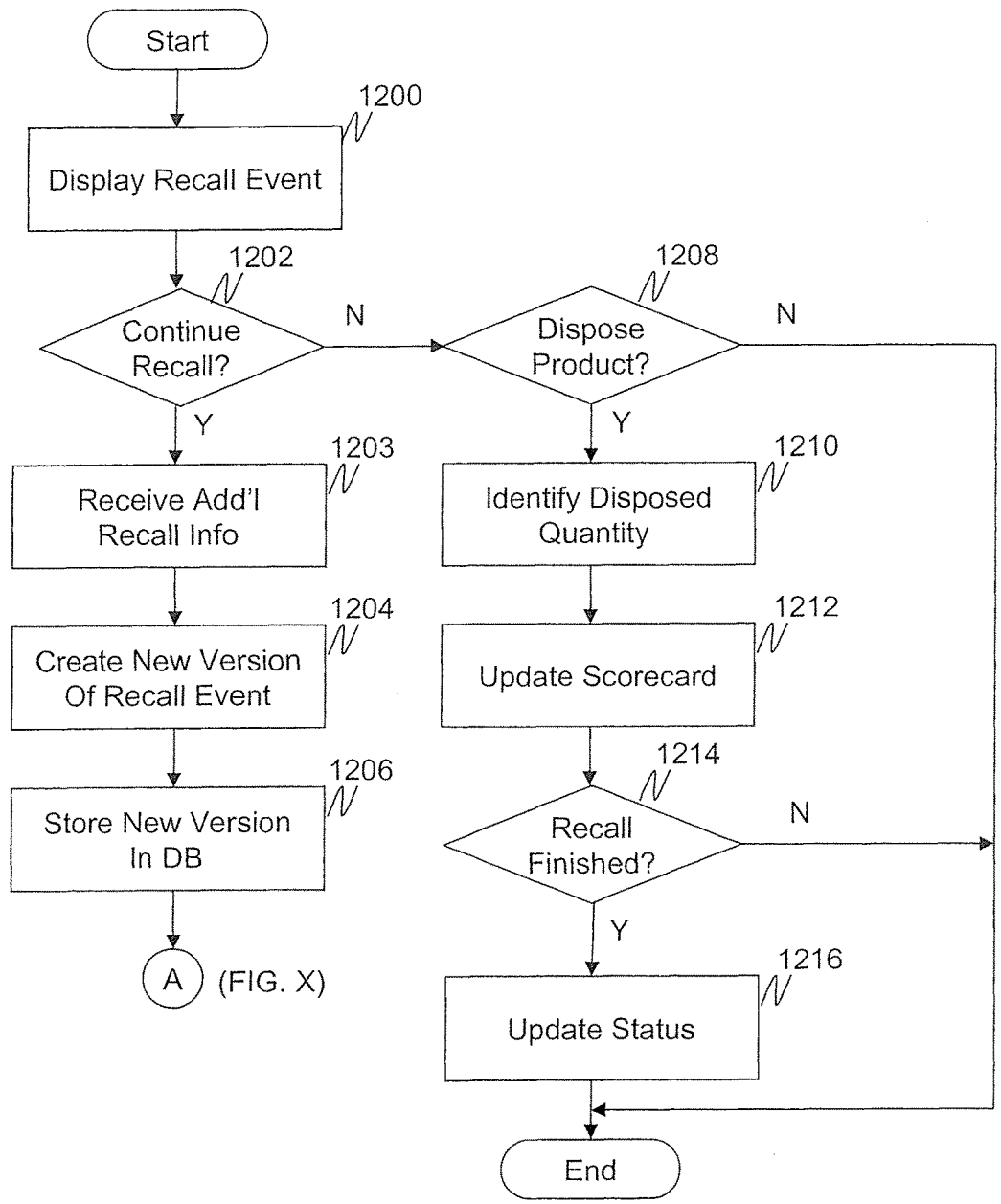
FIG. 15 is a flow diagram of a process for interacting with a customer receiving a recall notification according to one embodiment of the invention.

FIG. 15 is a flow diagram of a process executed by the recall management module 116 for interacting with a customer receiving a recall notification according to one embodiment of the invention. The customer may be a distributor receiving a recall notification from a manufacturer, government agency, or another distributor. The customer may also be a POS establishment receiving the recall notification from the manufacturer, government agency, or distributor. The customer may further be an end purchaser receiving the recall notification from the manufacturer, government agency, or POS establishment.

When the customer receives a recall notification, the customer accesses the recall server 100 via, for example, a link provided in the recall notification. The server 100 identifies the type of customer and displays, in step 1200, information about the recall event customized for the identified customer type. For example, if the customer is identified as a distributor, the recall information is customized for a distributor view. Furthermore, the distributor may be provided with tools to update or add to the recall event, while such tools may not be available to a customer identified to be an end purchaser.

If the customer has the option of continuing the recall by updating or adding to the recall event, a determination is made in step 1202 as to whether the recall is to be continued. According to one embodiment of the invention, the customer who has the option of continuing a recall is a distributor. POS establishments, according to this embodiment, do not have an option of continuing a recall. If the answer to the determination in step 1202 is YES, additional information for the recall event, such as, for example, a list of additional customers that need to be notified, is received is received in step 1203, and a new version of the recall event generated based on the received updates in step 1204. In step 1206, the new version of the recall event is saved in the recall database in association with the original recall event. In this manner, the updated recall event may be monitored and tracked separately from the original recall event while maintaining the association with the original recall event for aggregate reporting and tracking. The process then proceeds to the notification steps of FIG. 13 for the customers associated with the updated recall event. In this regard, the customer continuing the recall event may generate new notification messages catered to the new customer group that is to receive the notifications.

In addition or in lieu of continuing a recall, the customer may also dispose of products according to the product disposition instructions received by the customer. In this regard, a determination is made is step 1208, as to whether the customer has indicated that recalled products have been disposed. If the answer is YES, the recall management module 116 identifies the quantity of products disposed as provided by the customer in step 1210. The customer continuously updates this quantity as the recall progresses.

As the quantities of products disposed is received for each version of the recall event, the recall management module updates a scorecard for the recall based on the recall quantities received. The scorecard may display the amount of products disposed versus the amount of products shipped to the particular customer. In addition, because the recall management module computes the amount of products disposed on an aggregate basis, the scorecard may also display a total amount of products disposed versus a total amount of products that have been sold.

In step 1214 a determination is made as to whether the recall has finished/completed. The recall may be deemed finished if all (or a certain percentage) of the sold products have been disposed or accounted for, or if the recall period has expired. If the recall has finished, the status of the recall event is updated in the database as being completed. Reports may be generated at this time, and/or notifications may be transmitted to relevant government agencies of the termination of the recall event.

According to one embodiment of the invention, different status information can be associated to a recall event throughout the recall process. For example, the status of a recall event may be indicated as being pending (i.e. recall event being generated), ready (i.e. recall ready to be notified), communicating (i.e. recall notifications being sent), new (i.e. new for a customer who receives the recall notification), in progress, saved, and/or completed.

One distinct benefit of the recall management and monitoring system according to the above embodiments is the ability to quantify the amount of product recovered against the amount distributed. The feature of notifying points in the supply chain of the amount of recalled product they received adds great value to the monitoring of recall processes. Especially in the event of intentional contamination (i.e. bioterrorism), knowledge of the amount of distributed product and recovered product will have significant benefit in preparing for morbidity and mortality rates that require specialized care. This feature has the benefit of not just tracking the recall at a macro level, but breaking the recall down into subsets by following the distribution of the product and quantifying recovery.

Another distinct benefit of the recall management and monitoring system according to the above embodiments is the ability to identify all business recipients of a recalled product, and then automate completion of regulatory forms (FDA form 177, FDA's Adulterated Food Registry, etc.). The Adulterated Food Registry law was passed at the end of 2007. This law requires identification of all entities holding recalled products. The ability of the recall server to track the distribution of product that is subsequently recalled from the manufacturer, through distributor(s), to multiple points of sale, allows an automated mechanism of complying with this law. Form 177 is a form that businesses have to complete in the event of a recall, that will be automated through manipulation of product and distribution data captured in the recall server 100.

A third feature of the recall management and monitoring system according to the above embodiment of the invention is the sense of urgency to remove product from supply that the invention communicates with its defined time frames and automated exception reports at specified intervals. This urgency of recall communication and completion is vital for both intentional and unintentional contamination events where public health is at risk. One characterization of this capacity could be an "active" recall management system versus. a "passive" system.

A fourth feature of the recall management and monitoring system according to the above embodiment of the invention is the amount of security built into the system to verify and validate users, and to control access to the system in a way that ensures proper use and recall administration. According to one embodiment, these security features include, but are not limited to the following:

a) users only can create users that have the same company as the creator;
 b) all recalls that are sent out are attached to a manufacturer user id, allowing tracking of the user who sent out the recall;
 c) recalls are only sent out to users on event based recall distribution list;
 d) only users with correct permissions can send out recalls;
 e) only users with correct permissions can modify personal contact info;
 f) Users can only view their own recalls, the ones they created;
 g) Users can only view recalls sent to them;
 h) Users with correct permissions can view other company recalls;

i) All CGI calls validate the user hash table to maker sure they are who they log in as;
j) All CCGI calls post their data thus hidden to URL;
k) All CGI calls validate session id for valid sessions;
l) All logins require a password and email conformation;
m) All reports are executed in PDF form;

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A method for providing an end-to-end monitoring and managing of product recalls across a supply chain, the method comprising:
   prompting a recall initiator by a processor invoking a recall wizard to enter first product recall information for a recall event, the first product recall information including a first item identifier identifying a first recalled product and first product disposition instructions;
   storing, by the processor, the first product recall information in a centralized recall database;
   receiving over a wide area network a first command from the recall initiator to initiate the recall event, wherein the recall event is initiated in response to the first command;
   identifying, by the processor, a first supplier and a second supplier associated with the recall initiator;
   identifying, by the processor, for each of the first and second suppliers, respectively first and second customer types and respectively first and second customer status, the first and second customer types identifying a role of respectively the first and second suppliers in the supply chain, and the first and second customer status identifying a relationship of respectively the first and second suppliers to the first recalled product, wherein the first and second suppliers are identified via respectively the first and second customer types as being in the supply chain of the recall initiator, the first supplier is identified via the first customer status as having received the first recalled product, and the second supplier is identified via the second customer status as not having received the first recalled product;
   providing, by the processor, over the wide area network, targeted messages to the first and second suppliers relating to the recall event based on the identified customer status, wherein the targeted messages are customized based on both the identified customer type and the identified customer status, wherein a first end user device accessible to the first supplier identified with the first customer status is configured to receive a first electronic message including a first link for accessing the first product recall information and further including a first message content for indicating that the first supplier is affected by the recall event, and a second end user device accessible to the second supplier identified with the second customer status is configured to receive a second electronic message different from the first electronic message, the second electronic message including a second link for accessing the first product recall information and further including a second message content for indicating that the second supplier is not affected by the recall event;
   displaying by the processor to the first end user device accessible to the first supplier, in response to detecting actuation of the first link, all or a portion of the first product recall information and one or more tools;
   receiving by the processor from the first end user device accessible to the first supplier actuation of the one or more tools for seamlessly continuing the recall event to a third supplier, wherein the third supplier is downstream to the first supplier in the supply chain, wherein the continuing the recall event to the third supplier includes:
      retrieving, by the processor, from the centralized recall database, data for the recall event, wherein the data includes the first item identifier identifying the recalled product;
      receiving, by the processor, based on first input from the first supplier, an update to the recall event, wherein the update includes identification of a second recalled product having a second item identifier different from the first item identifier, the update further including identification of a third supplier downstream from the first supplier;
      designating, by the processor, the third supplier with a customer type based on second input from the first supplier, and further designate the third supplier with the first or second customer status based on whether or not the third supplier has received the second recalled product; and
      continuing, by the processor, the recall event for the second recalled product having the second item identifier, wherein continuing the recall event includes transmitting, by the processor, second product recall information for the second recalled product to the third supplier including targeted second product disposition instructions;
   displaying by the processor to the second supplier, in response to detecting actuation of the second link, all or a portion of the product recall information but no tools for continuing or expanding the recall event;
   independently tracking product disposition of the first recalled product and the second recalled product;
   receiving by the processor from the first supplier a first quantity of the first recalled product disposed according to the first product disposition instructions;
   receiving from the second supplier a second quantity of the second recalled product disposed according to the second product disposition instructions;
   monitoring for a trigger for completing the recall event;
   in response to detecting the trigger, tagging the recall event as completed;
   aggregating the first quantity and the second quantity;
   updating by the processor, in real time, a total disposition quantity for the recall event in the centralized recall database based on the aggregated first and second quantities; and
   generating by the processor an output based on the total disposition quantity.

2. The method of claim 1, wherein the identifying of the customer type is based on input from the recall initiator.

3. The method of claim 1, wherein the customer type is selected from a group consisting of a distributor, retailer, and consumer.

4. The method of claim 1, wherein the first customer status identifies the first supplier as receiving the recalled product and in response, the processor is configured to select as the first message a message for indicating that the first supplier is affected by the recall event, and the second supplier status identifies the second supplier as not receiving the recalled product and in response, the processor is configured to select as the second message a message for indicating that the second supplier is not affected by the recall event.

5. The method of claim 1, wherein the identifying the customer status includes:
   determining for each of the first and second suppliers an amount of the recalled product provided to the supplier;
   in response to determining that the amount provided to the first supplier is greater than 0, assigning the first customer status to the first supplier with the first customer status;
   in response to determining that the amount provided to the second supplier is not greater than 0, assigning the second customer status to the second supplier.

6. The method of claim 1, wherein the one or more tools for seamlessly continuing the recall event include a tool for adding the third supplier for receiving a notification of the recall event.

7. The method of claim 6, wherein the one or more tools for seamlessly continuing the recall event include a tool for adding a second product to the recall event.

8. A server adapted to provide an end-to-end monitoring and managing of product recalls across a supply chain, the server comprising:
   a processor;
   a memory coupled to the processor and storing computer instructions therein, the processor being configured to execute the program instructions, the program instructions including:
      prompting a recall initiator via a recall wizard to enter first product recall information for a recall event, the first product recall information including a first item identifier identifying a first recalled product and first product disposition instructions;
      storing the first product recall information in a centralized recall database;
      receiving over a wide area network a first command from the recall initiator to initiate the recall event, wherein the recall event is initiated in response to the first command;
      identifying a first supplier and a second supplier associated with the recall initiator;
      identifying for each of the first and second suppliers, respectively first and second customer types, and respectively first and second customer status, the first and second customer types identifying a role of respectively the first and second suppliers in the supply chain, and the first and second customer status identifying a relationship of respectively the first and second suppliers to the first recalled product, wherein the first and second suppliers are identified via respectively the first and second customer types as being in the supply chain of the recall initiator, the first supplier is identified via the first customer status as having received the first recalled product, and the second supplier is identified via the second customer status as not having received the first recalled product;
      providing over the wide area network, targeted messages to the first and second suppliers relating to the recall event based on the identified customer status, wherein the targeted messages are customized based on both the identified customer type and the identified customer status, wherein a first end user device accessible to the first supplier identified with the first customer status is configured to receive a first electronic message including a first link for accessing the first product recall information and further including a first message content for indicating that the first supplier is affected by the recall event, and a second end user device accessible to the second supplier identified with the second customer status is configured to receive a second electronic message different from the first electronic message, the second electronic message including a second link for accessing the first product recall information and further including a second message content for indicating that the second supplier is not affected by the recall event;
      displaying to the first end user device accessible to the first supplier, in response to detecting actuation of the first link, all or a portion of the first product recall information and one or more tools;
      receiving from the first end user device accessible to the first supplier, actuation of the one or more tools for seamlessly continuing the recall event to a third supplier, wherein the third supplier is downstream to the first supplier in the supply chain, wherein the instructions for continuing the recall event to the third supplier include instructions that cause the processor to:
         retrieve from the centralized recall database, data for the recall event, wherein the data includes the first item identifier identifying the recalled product;
         receive, based on first input from the first supplier, an update to the recall event, wherein the update includes identification of a second recalled product having a second item identifier different from the first item identifier, the update further including identification of a third supplier downstream from the first supplier;
         designate the third supplier with a customer type based on second input from the first supplier, and further designate the third supplier with the first or second customer status based on whether or not the third supplier has received the second recalled product; and
         continue the recall event for the second recalled product having the second item identifier, wherein continuing the recall event includes transmitting second product recall information for the second recalled product to the third supplier including targeted second product disposition instructions;
      displaying to the second supplier, in response to detecting actuation of the second link, all or a portion of the product recall information but no tools for continuing the recall event;
      independently tracking product disposition of the first recalled product and the second recalled product;
      receiving from the first supplier a first quantity of the first recalled product disposed according to the first product disposition instructions;
      receiving from the second supplier a second quantity of the second recalled product disposed according to the second product disposition instructions;
      monitoring for a trigger for completing the recall event;
      in response to detecting the trigger, tagging the recall event as completed;
      aggregating the first quantity and the second quantity;

updating, in real time, a total disposition quantity for the recall event in the centralized recall database based on the aggregated first and second quantities; and generating an output based on the total disposition quantity.

9. The server of claim 8, wherein the recall wizard is configured to guide the recall initiator through a step-by-step process for inputting the product recall information.

10. The server of claim 8, wherein the portion of the product recall information displayed to each of the suppliers is configured to be customized based on the customer type and customer status associated with the particular supplier, and the recalled product associated with the particular supplier.

11. The server of claim 8, wherein the message to each of the suppliers is configured to be customized based on the customer status assigned to the customer supplier.

12. The server of claim 8, wherein the identifying of the customer type is based on input from the recall initiator.

13. The server of claim 8, wherein the customer type is selected from a group consisting of a distributor, retailer, and consumer.

14. The server of claim 8, wherein the first customer status identifies the first supplier as receiving the recalled product and in response, the processor is configured to select as the first message a message for indicating that the first supplier is affected by the recall event, and the second supplier status identifies the second supplier as not receiving the recalled product and in response, the processor is configured to select as the second message a message for indicating that the second supplier is not affected by the recall event.

15. The server of claim 8, wherein the program instructions for identifying the customer status includes program instructions for:

determining for each of the first and second customers an amount of the recalled product provided to the supplier;

in response to determining that the amount provided to the first supplier is greater than 0, assigning the first supplier status to the first-supplier;

in response to determining that the amount provided to the second supplier is not greater than 0, assigning the second customer status to the second supplier.

16. The server of claim 8, wherein the one or more tools for seamlessly continuing the recall event include a tool for adding the third supplier for receiving a notification of the recall event.

17. The server of claim 16, wherein the one or more tools for seamlessly continuing the recall event include a tool for generating and sending, by the first supplier, a notification of the recall event via one or more communication devices for delivery to the third supplier.

18. The server of claim 8, wherein the one or more tools for seamlessly continuing the recall event include a tool for adding a second product to the recall event.

19. The server of claim 8, wherein the one or more tools include a tool for modifying, by the first supplier, the item identifier and/or adding new configuration of the recalled product for processing the recall for the third supplier.

20. The server of claim 8, wherein the program instructions further include:

monitoring progress of the recall event;

detecting a trigger condition during the monitoring; and closing the recall event in response to identifying the trigger condition, wherein the closing includes updating a status of the recall event as being completed.

21. The server of claim 8, wherein the program instructions further include:

offering one or more tools to the third supplier for managing the recall event, wherein the one or more tools are accessible for actuating by the third supplier for event response and/or event modification for seamlessly continuing the recall event with enhanced recall information to a fourth supplier, wherein notifications are provided to all necessary suppliers with recall information tailored the needs of the suppliers.

* * * * *